(12) United States Patent
Parekh et al.

(10) Patent No.: US 11,290,526 B2
(45) Date of Patent: Mar. 29, 2022

(54) SIDECAR AD SERVER FOR LINEAR BROADCAST

(71) Applicant: Jelli, Inc., San Mateo, CA (US)

(72) Inventors: Jateen P. Parekh, San Mateo, CA (US); Yuri Regelman, Milbrae, CA (US); Bo-Lin Hsu, Fremont, CA (US); John Paul LeFlohic, San Mateo, CA (US)

(73) Assignee: Jelli, Inc., San Mateo, CA (US)

( * ) Notice: Subject to any disclaimer, the term of this patent is extended or adjusted under 35 U.S.C. 154(b) by 53 days.

(21) Appl. No.: 16/561,553

(22) Filed: Sep. 5, 2019

(65) Prior Publication Data

US 2020/0076882 A1 Mar. 5, 2020

Related U.S. Application Data

(63) Continuation of application No. 15/136,808, filed on Apr. 22, 2016, now Pat. No. 10,447,768.

(60) Provisional application No. 62/151,798, filed on Apr. 23, 2015.

(51) Int. Cl.
| | |
|---|---|
| *G06F 15/16* | (2006.01) |
| *H04L 67/10* | (2022.01) |
| *H04N 21/81* | (2011.01) |
| *H04L 67/02* | (2022.01) |
| *H04L 69/16* | (2022.01) |
| *H04N 21/234* | (2011.01) |
| *H04N 21/233* | (2011.01) |
| *H04N 21/235* | (2011.01) |
| *G06F 3/16* | (2006.01) |

(52) U.S. Cl.
CPC .............. *H04L 67/10* (2013.01); *G06F 3/165* (2013.01); *H04L 67/02* (2013.01); *H04L 69/16* (2013.01); *H04N 21/233* (2013.01); *H04N 21/2353* (2013.01); *H04N 21/23424* (2013.01); *H04N 21/812* (2013.01)

(58) Field of Classification Search
CPC ......... H04L 67/10; H04L 67/02; H04L 69/16; G06F 3/165; H04N 21/233; H04N 21/23424; H04N 21/2353; H04N 21/812
USPC ....................................................... 709/204
See application file for complete search history.

(56) References Cited

U.S. PATENT DOCUMENTS

| | | | |
|---|---|---|---|
| 9,548,825 B1 | 1/2017 | Regelman | |
| 2010/0242079 A1* | 9/2010 | Riedl ................. | H04N 7/17318 725/115 |
| 2012/0096486 A1* | 4/2012 | Stallard ................ | H04H 20/106 725/32 |
| 2012/0214544 A1* | 8/2012 | Shivappa ........... | G06Q 30/0261 455/556.1 |

(Continued)

*Primary Examiner* — George C Neurauter, Jr.
*Assistant Examiner* — Joel Mesa
(74) *Attorney, Agent, or Firm* — Van Pelt, Yi & James LLP

(57) ABSTRACT

One or both of a metadata associated with content to be integrated into a linear broadcast and a content data comprising content to be integrated into the linear broadcast is received via a network. A trigger to integrate content into said linear broadcast is received from a broadcast automation system associated with the linear broadcast. Based at least in part on said metadata a content item is determined to be integrated into the linear broadcast in response to the trigger. The determined content item is integrated into the linear broadcast, including by providing to a mixing node associated with the linear broadcast a broadcast-ready audio output.

20 Claims, 12 Drawing Sheets

(56) References Cited

U.S. PATENT DOCUMENTS

| | | | | |
|---|---|---|---|---|
| 2014/0123175 A1* | 5/2014 | Cormie | ............... | H04N 21/812 |
| | | | | 725/34 |
| 2014/0273891 A1* | 9/2014 | Costa | ...................... | H04B 1/18 |
| | | | | 455/90.2 |
| 2014/0282723 A1* | 9/2014 | Sinha | .................. | H04N 21/812 |
| | | | | 725/35 |

* cited by examiner

SIDECAR AD SERVER FOR LINEAR BROADCAST

CROSS REFERENCE TO OTHER APPLICATIONS

This application is a continuation of co-pending U.S. patent application Ser. No. 15/136,808 entitled SIDECAR AD SERVER FOR LINEAR BROADCAST filed Apr. 22, 2016, which claims priority to U.S. Provisional Patent Application No. 62/151,798 entitled SIDECAR AD SERVER FOR LINEAR BROADCAST filed Apr. 23, 2015, both of which are incorporated herein by reference for all purposes.

BACKGROUND OF THE INVENTION

Broadcast networks such as those in radio and television offer advertising spots to finance operations. The matching of advertising spots to advertisements in a broadcast network differs from the matching in other media, such as online advertising, at least in part because of the nature of planning broadcast schedules in advance and the one-way one-to-many nature of a broadcast network. Determining advertising spots in broadcast networks is currently a complex and manual process that does not necessarily maximize benefit to either advertiser or broadcaster.

BRIEF DESCRIPTION OF THE DRAWINGS

Various embodiments of the invention are disclosed in the following detailed description and the accompanying drawings.

DETAILED DESCRIPTION

Figure 1:
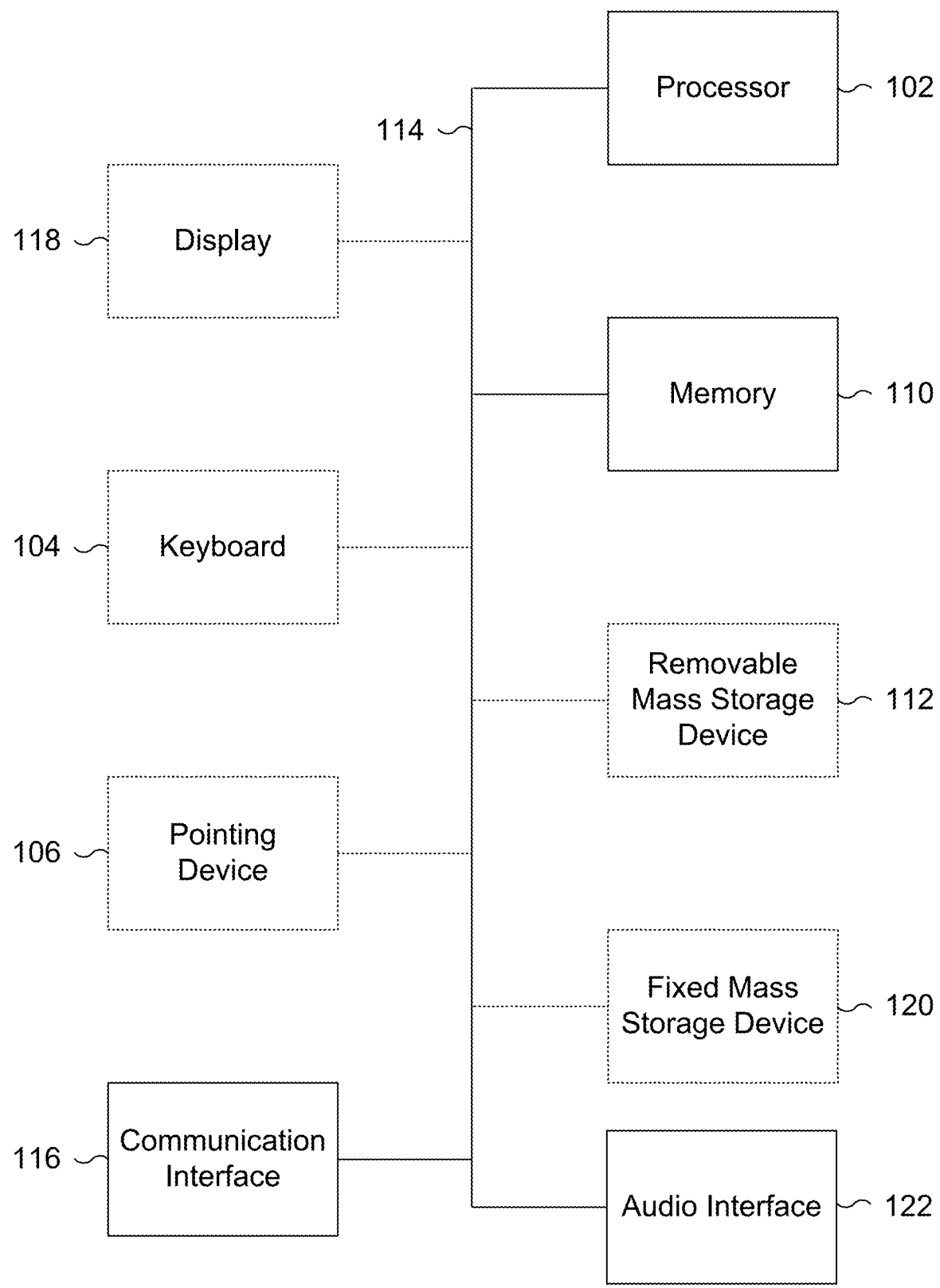
FIG. 1 is a functional diagram illustrating a programmed computer system to be used as a sidecar appliance in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A sidecar ad server appliance for linear broadcast is disclosed. The sidecar appliance sits locally to each linear broadcast station coupled to the internet, for example the internet cloud, to provide dynamic content insertion for the linear broadcast station with a low footprint that is interchangeable and avoids disrupting the existing linear broadcast station equipment, including the programming server, traffic server, and automation systems, including utility server and play out systems.

The appliance always plays audio for linear broadcast. Break Triggers (or requests) may be sent from the local broadcast systems (automation system) at any time. The spots/campaigns that play are determined in real time by the appliance and instructions generated by the cloud platform. The appliance will play the spots/campaigns most effective at that time, with the goal of clearing all paid spots. In addition to paid spots, bonus, and non-paid spots may also play if no paid spots are available, or allowed, to play. The appliance is required to ensure that local operation is never disrupted, even with a local ISP or internet goes down. The local appliance is also required to play out audio at expected broadcast levels.

Sidecar appliance features and/or functions and details in various embodiments may include:
1. Networking—Network stack that communicates with local broadcast systems, and over the internet to communicate with a cloud platform, for example an ad exchange for broadcast;
2. Break Trigger—Audio or TCP/IP message trigger detection. The trigger communicates at least one of the following: the Ad Network representative, the Ad Network name, or package (Male, Female, Sports, Rock, Electronic, etc.), and break length (30 sec, 60 sec, 90 sec, and so on);
3. Media Management and Storage—Local storage of audio media, appliance configuration, and playback instructions. Storage may occur in volatile (local memory) or non-volatile memory (HDD/SSD). This includes the logic to determine what campaign and spot to play based on instructions provided by the cloud platform;

4. Local Time—kept up-to-date using local time retrieved from the internet (NTP/Linux Network Time Protocol);
5. Audio Playback—playback of audio media/creative, for example advertising or commercials, to fill a break length from the Ad Network representative/Ad Network name, or package. Audio playback may be analog or digital (AES), or AoIP (Audio over IP);
6. Audio Recording—Recording of program audio as broadcast, including the spots played out by the appliance;
7. Reporting—Appliance to send to the cloud platform at least one of the following: the trigger event times, what played, and a copy of the audio spot that was recorded;
8. Audio Analysis—The cloud platform, as an extension to the appliance, compares the audio recorded to the spot that played, and confirms the spot play using a fingerprint/watermarking technique;
9. Handling any local data feeds for up to date event triggers (weather, political events, sporting events, and so on); and
10. Local management utility—the appliance may contain a local management utility that allows the broadcast engineer to administer audio levels, networking, generate test tones, confirm latest break triggers, change input level gains, and so on. This may also be done remotely using a tech ops web portal.

Any person having ordinary skill in the art will recognize that while certain examples are given throughout this specification for radio broadcast networks and/or stations and corresponding audio media, without loss of generality the same principles and disclosed techniques may be applied to television broadcast networks and/or stations and corresponding video media. Without loss of generality throughout this specification "broadcasting" refers generally to the distribution of audio, video, and/or multimedia content in a one-to-many model via any electronic mass communications medium or combination of media including electromagnetic spectrum, over the air/terrestrial media, cable/coaxial/wired media, satellite transmission media, and/or computer readable media. Broadcasting may also refer to print broadcasting.

Thus, throughout this specification, "media" may refer to any form of information transmission, for example radio, television, other communication using electromagnetic waves, cable, and/or computer transmissions. Throughout this specification, "users" refer to any consumers of the content, including listeners and viewers of the content. Throughout this specification, "broadcast" may refer to any one-to-many communication, including: radio broadcast, terrestrial radio broadcast, satellite radio broadcast, cable radio broadcast, digital radio broadcast, television broadcast, terrestrial television broadcast, satellite television broadcast, cable television broadcast, digital television broadcast, broadcast over electromagnetic waves, broadcast over electromagnetic signals, broadcast over coaxial cable, broadcast over twisted pair cable, and broadcast via dynamic billboards or signs.

Any person having ordinary skill in the art will recognize that while certain examples are given throughout this specification for radio broadcast networks and/or stations and corresponding audio media, without loss of generality the same principles and disclosed techniques may be applied to television broadcast networks and/or stations and corresponding video media. Without loss of generality throughout this specification "broadcasting" refers generally to the distribution of audio, video, and/or multimedia content in a one-to-many model via any electronic mass communications medium or combination of media including electromagnetic spectrum, over the air/terrestrial media, cable/coaxial/wired media, satellite transmission media, and/or computer readable media. Broadcasting may also refer to print broadcasting.

Thus, throughout this specification, "media" may refer to any form of information transmission, for example radio, television, other communication using electromagnetic waves, cable, and/or computer transmissions. Throughout this specification, "users" refer to any consumers of the content, including listeners and viewers of the content. Throughout this specification, "broadcast" may refer to any one-to-many communication, including: radio broadcast, terrestrial radio broadcast, satellite radio broadcast, cable radio broadcast, digital radio broadcast, television broadcast, terrestrial television broadcast, satellite television broadcast, cable television broadcast, digital television broadcast, broadcast over electromagnetic waves, broadcast over electromagnetic signals, broadcast over coaxial cable, broadcast over twisted pair cable, and broadcast via dynamic billboards or signs.

The example of radio is given now, but these principles may be applied for example to television similarly.

FIG. 1 is a functional diagram illustrating a programmed computer system to be used as a sidecar appliance in accordance with some embodiments. As shown, FIG. 1 provides a functional diagram of a system programmed to be used as a sidecar appliance in accordance with some embodiments. As will be apparent, other computer system architectures and configurations can be used as a sidecar appliance. Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output of data on output devices, for example audio interface 122.

Processor 102 is coupled bi-directionally with memory 110, which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data and objects used by the processor 102 to perform its functions, for example programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown. The processor 102 may also include a coprocessor (not shown) as a supplemental processing component to aid the processor and/or memory 110.

An optional removable mass storage device 112, shown as optional with a dotted line, provides additional data storage capacity for the computer system 100, and is coupled either bi-directionally (read/write) or uni-directionally (read only) to processor 102. For example, storage 112 can also include computer-readable media such as a USB flash drive, magnetic tape, flash memory, PC-CARDS, portable mass storage devices, holographic storage devices, and other storage devices. An optional fixed mass storage 120 can also, for example, provide additional data storage capacity. The most common example of mass storage 120 is a solid state drive, or a hard-disk drive. Mass storage 112, 120 generally store additional programming instructions, data, and the like that typically are not in active use by the processor 102. It will be appreciated that the information retained within mass storage 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. When set up in a local linear broadcast station, these devices are usually not used, but as shown, these can optionally include a display monitor 118, a keyboard 104, and a pointing device 106, as well as an auxiliary input/output device interface, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification "network" refers to any interconnection between computer components including the Internet, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, WiFi, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous, heterogeneous systems and/or groups of systems together. Additional mass storage devices, not shown, can also be connected to processor 102 through network interface 116.

An optional auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

An audio interface 122 can be used in conjunction with sidecar appliance 100. The audio interface may include both audio input hardware and/or audio output hardware capable of recording and playing broadcast quality audio, for example eight channels of up to 24 bit resolution audio data sampled at 44.1 kHz or 192 kHz. In one embodiment, the audio interface may use any audio protocols used in broadcast, for example pulse positional modulation (PPM) and/or pulse coded modulation (PCM) audio. In one embodiment, the audio interface 122 is compatible and/or can implement governmental broadcast requirements, for example a seven second/profanity broadcast delay. In one embodiment, the audio interface 122 includes specialty connectors such as XLR connectors to interface with broadcast/studio audio/visual equipment. In one embodiment, appliance 100 and/or audio interface 122 includes audio compression, including gain control and/or normalization, silence detection, and signal processing, for example filters to filter over 15 kHz for FM radio broadcast. In one embodiment, an audio interface 122 includes an AudioScience ASI5640, ASI5641, ASI5644, and/or an Digigram VX222e, VX222e-Mic, VX881HR, and/or VX8882HR.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Advertising and Broadcast.

Figure 2:
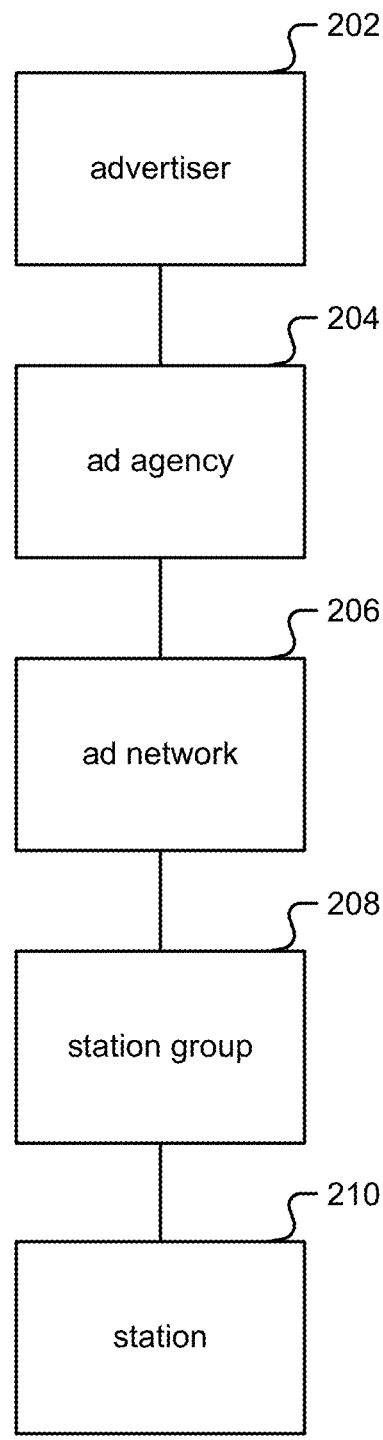
FIG. 2 is a hierarchical diagram illustrating example parties involved in the creation and placement of an ad for broadcast.

FIG. 2 is a hierarchical diagram illustrating example parties involved in the creation and placement of an ad for broadcast. A national Advertiser 202 has one or more products, services, and/or messages as advertising on broadcast media. Advertiser 202 retains an ad agency 204 to develop the ad campaign. For the purposes of this specification the ad campaign may be a national campaign or a regional campaign. An ad campaign may include one or more Request For Proposal ("RFP") specifications. An RFP specification may include targeting information, including demographics, markets, market characteristics, weeks, and periods of each week. An RFP specification may also include sizing specifications, including a flexible combination of budget limit, impressions goal, or impressions per price rate limiters. Impressions and/or impacts are a measure of the audience of a station when an ad is broadcast, and are statistically determined by companies such as Arbitron/ Nielsen via diary or automated listeners, for example by the hour. An RFP may request impressions in terms of Gross Ratings Points ("GRP"s) in a specific demographic wherein 1 GRP is 1% of the national population within the specific demographic. For example if an ad campaign requests 2 GRPs for women aged 18-45, and it is determined that 65 million women are aged 18-45 nationally, then the ad campaign requests 2% of 65 million or 1.3 million impressions within that demographic.

The ad campaign also comprises one or more ad-creative assets, for example audio creative suitable for a radio ad, video creative suitable for television, and online creative suitable for internet distribution. In some embodiments, advertiser 202 comprises an internal ad agency team 204 within the same corporation.

Ad agency 204 then retains an ad network 206 for publication and/or distribution of the ad campaign. An ad network 206 manages a portion of the placement spots available on multiple broadcast stations 210. Each broadcast station 210 may be independent of the ad network 206 or may be part of the ad network 206. The ad network 206's inventory is the collection of placement spots available on the broadcast media of each broadcast station 210. As will be further elaborated, each spot comprises a position, for example a day of week and/or a daypart (for example, 'AM Drivetime', 'lunch', 'PM Drivetime', or 'evening'). Ad network 206's inventory may be acquired based on direct affiliation with specific broadcast stations 210 and/or may be acquired based on affiliation with station groups 208 comprising multiple broadcast stations 210.

The Ad Network.

Radio stations typically have relatively fixed ad breaks, typically twice per hour. A full break might be 5 minutes long, with 4 minutes of advertising. Stations 210 attempt to fill most of each ad break with local advertisers as these tend to pay substantially more to the station 210 than national-product advertising by advertisers 202. However, stations 210 usually do not have enough demand to fully fill the ad-placement spots they have. These ad spots are thus called a station's inventory. The station 210 will thus contract out a portion of their inventory to an ad network 206. The ad network 206 mediates between a large group of stations 208, 210 and national advertisers 202. An ad network 206 may be necessary because the logistical overhead of advertisers 202 interacting directly with stations 210 would be prohibitive for both stations 210 and advertisers 202.

Station Inventory.

Figure 3:
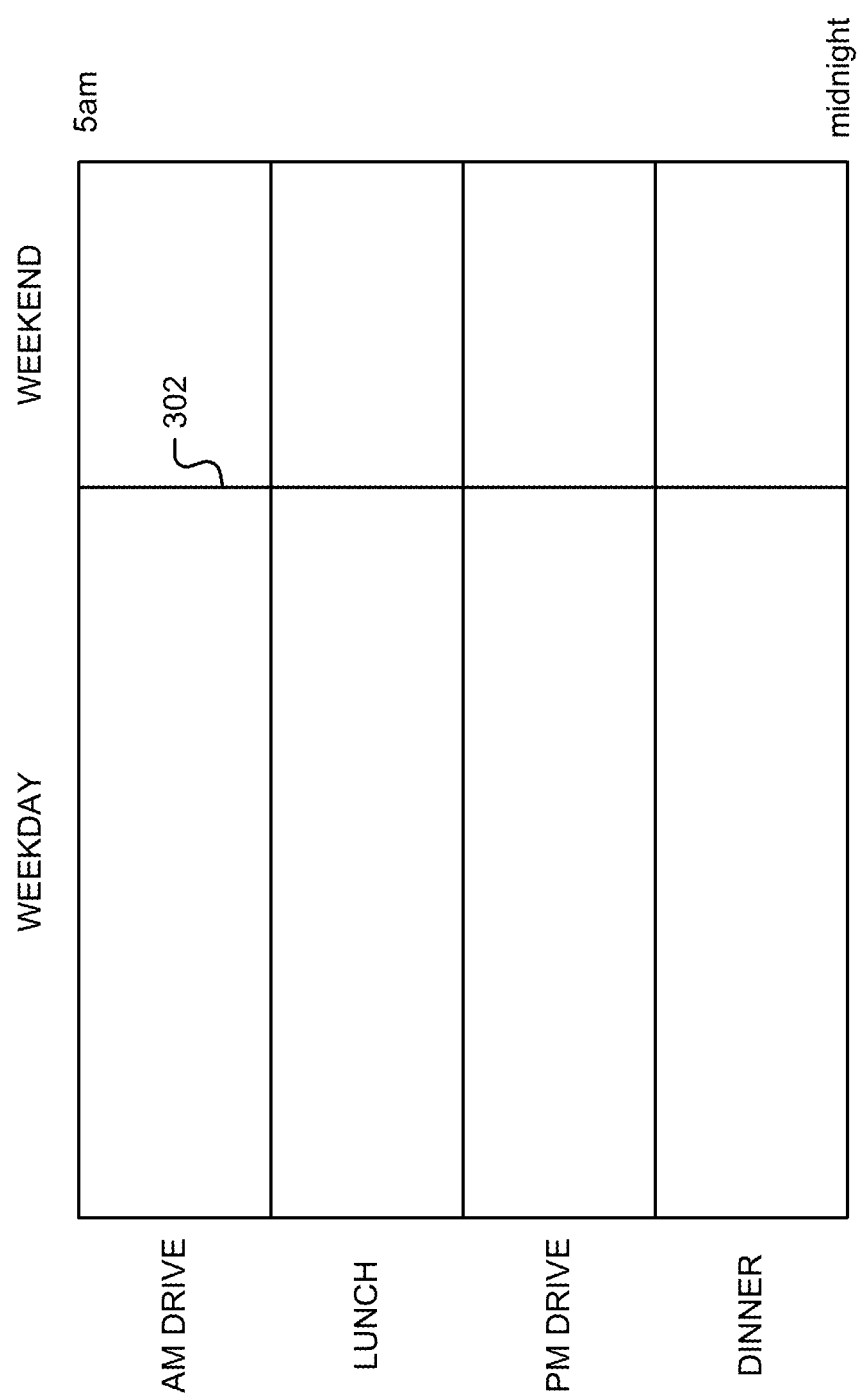
FIG. 3 is an illustration depicting radio broadcast dayparts.

FIG. 3 is an illustration depicting radio broadcast dayparts. In a radio embodiment, the station 210 typically provides the ad network 206 with inventory for each week, for example twenty-eight pieces of inventory. Each of the seven days of the week has an inventory for four typical dayparts: AM Drive (referring to the morning drive time to work for commuters), Midday, PM Drive (also known as afternoon drive time), and Evening. An inventory is specified by giving the part of the week it covers called a "daypart" 302, the number of ad breaks it contains and the seconds duration each break is to last.

For example, an inventory might cover the "Monday 5 a-10 a" daypart (referring to 5 am to 10 am on Monday), and contain two 60-second breaks. This would indicate that the station agrees to play one minute of the network's ad content (an "ad break" from the network's perspective) at two points during the daypart Monday 5 a-10 a. However, the station 210 does not explicitly state when they will play the breaks, only that they will not play them too close together, for example within 25 minutes of each other. The coarseness of the contract allows the station 210 to retain some flexibility with where it places its network ads, while still allowing the network 206 to place advertisers' ads into the part of the day they desire.

A Single Campaign.

A broadcast network 206 may represent inventory from hundreds or thousands of stations 210. When an advertiser 202 approaches them about running an ad campaign, the advertiser 202 may specify directly or indirectly what demographic, for example Women 18-49 or w18-49, and daypart they would like to play in and how many impressions they would like to get. The advertiser may specify a wide daypart such as Monday-Friday 5 a-10 a; that is, a daypart does not need to be on a single day. The daypart can also be complex, specifying several parts of the week: "Monday-Friday 5 a-10 a; Monday-Friday 3 p-8 p". The network 206 then determines how large a campaign they can sell the advertiser 202 and presents the plan to them as a proposal. If the advertiser approves, the plan becomes booked.

In one embodiment, a campaign plan moves between four business-process states: saved, proposed, reserved, and booked:

Saved—When the ad network 206 has formed a plan but has not yet presented it to an advertiser 202 for their approval, the plan is "saved". Because a saved plan has not been externally published yet, the network 206 is typically free to alter it as much as they want.

Proposed—Once the ad network 206 presents a plan to an advertiser 202 for their approval, the plan is "proposed". Proposing the plan means that the network 206 gives up much of its flexibility to alter the plan going forward. However, as the plan has not yet been committed to by the advertiser 202, the network 206 does not reserve the inventory the plan uses.

Reserved—Often times, the network 206 has reason to be confident that an advertiser 202 is likely to approve a plan, or at least, a plan very similar to it. In that case, the network 206 can go ahead and reserve the inventory while they wait for approval to be sure that no other plans end up taking those inventory spots.

Booked—Once the advertiser 202 has committed to a plan, it is booked, which means that the plan, in addition to reserving certain spots, is approved to actually play as well.

Typically, when a broadcast station 210 fills up their advertising spots with ad-campaign placements, they quickly run out of space and may not fit additional campaigns into the fragmented bits of inventory remaining. The fragmented bits that remain may not be used because each advertiser 202 prefers to have their campaign to play a substantial amount within specific dayparts. This station 210 level fragmentation loss affects the stations' 210 overall inventory, not just the inventory they have given to ad networks 206, and constitutes one major source of lost value.

By analogy, imagine that a restaurant only received parties often to twenty people. Additionally, each party was specific about which parts of the restaurant they were willing to sit in. After a few large parties are seated, the remaining seats will be a patchwork that may not fit any additional parties.

The situation may be worsened for the ad network 206, which represents hundreds to thousands of stations 210. The ad network 206 may attempt to solve an analogous fragmentation puzzle involving the inventory slices from each of its affiliated stations 210. The ad network 206's inventory thus is often 20% to 30% unsold simply because the inventory has been fragmented into an incoherent jumble. When inventory goes unsold, the broadcast media is filled with lower performing filler such as non-profit and/or government messages such as public service announcements that do not contribute substantively towards the station 210, station group 208, and/or network 206.

Currently, ad distribution and delivery in the broadcast industry is "pen and paper" or manually performed, due at least in part to an entrenched history of how it has been done, and due to the heterogeneity of broadcast stations throughout a country. The technologies, process, culture, and business concerns of stations may vary dramatically, necessitating a lowest-common-denominator approach where hundreds of people at the ad network 206 directly interact, via phone or email, with several people at each of the hundreds or thousands of stations 210 that are in the network.

Typically, there is also little to no feedback loop on how well things were actually delivered. As a practical measure, agencies 206 and stations 208, 210 have a "don't ask, don't tell" policy when it comes to delivery problems, despite there being perhaps 20% to 30% under-delivery due to various problems. Examples of delivery problems are the wrong ad played, played at wrong time, or played next to a competitor's ad, or the ad was not played, played too poorly, or played when the broadcasting tower was broken, and so on.

With the complexity of matchmaking exceeding the practical limits of a manual pen-and-paper method, networks 206 typically cope by requiring that advertisers 202 buy a homogenized slice and/or bundle, called a "network minute", across all the stations 210 in their network 206. In this way, the inventory does not get broken up and things do not get complicated. While this does reduce complexity, it adds inefficiency. The advertiser 202 gets little say in who they target (for example, which stations 210) or when they play (for example, which daypart). Thus, using network minute delivery is completely unoptimized to what the advertiser 202 truly would want. As a result, the delivery is correspondingly less valuable to advertiser 202. This in turn lowers advertiser 202 demand, which may lead to waste inventory the network 206 again may not fully sell their inventory. Note that this potential loss due to unsold inventory is a loss in addition to poor matchup due to network-minute selling. That is, because there is no attempt to match the inventory to the detailed desires of the advertiser 202, the total value delivered by the inventory is substantially less than what it could be.

Typically, there are further complications. For example, ads that are placed in the same break may be compatible with each other. For example, two soft drink products from competing brands may not be in the same break. Some advertisers 202 do not want to share a break with what they consider to be a controversial product. Finally, some advertisers 202 do not want to be placed in what they consider to be controversial stations or controversial programs/hosts.

Typically, ad campaigns that last less than a week are rare. Usually they last for several weeks and end up competing for space used by other campaigns, which themselves may extend into a different set of weeks, stations, and dayparts.

Over the course of many months leading up to a particular week, the network 206 progressively learns about each campaign that would like to include that week in their plans. For each potential campaign, they may first form a proposed campaign plan to present to the advertiser 202. Typically, it may be many weeks before the advertiser 202 commits to the plan. Advertisers 202 often wait to commit until just a week or two before the go-live time, when the week in question starts.

A common issue is answering what the network 206 does with the inventory spots they assigned to the proposed campaign plan before the advertiser 202 commits. If the station 210 reserves that inventory for the advertiser 202, then they may not assign it to other campaigns. Acceptance rates are often as low as 30%, and that means opportunities may be missed. If the network 206 does not reserve a proposed plan's inventory, then other campaigns can be accommodated more flexibly. However, conflicts may occur if two plans eventually try to reserve/book some of the same inventory spots. In fact, if the network 206 does not reserve the inventory, then it is almost guaranteed that by the time the advertiser 202 commits, the network 206 will have to present a slightly revised plan to the advertiser 202 since some of the original plan will be "damaged" by other plans from other advertisers and must be "healed".

Healing is a process of repairing damaged plans by selecting alternative but equivalent placements. Automatic healing may be an important feature to support a frictionless workflow process for a fluctuating inventory pool. Possible use cases include using healing to mitigate inventory changes and/or mitigate lost competition with another plan. Anchored re-planning is a process of creating new plan revisions. Possible use cases include responding to change requests from a buyer, mitigating inventory changes, and/or mitigate lost competition with another plan. Anchored re-planning has at least three modes: a rigid mode allowing only decrements; a rigid mode within a spot's original station, week, and daypart—to allow an incremental spot count; and a "prefer" mode that prefers the original station, week, and daypart—to allow incremental stations.

Traditional Methods.

The need to allocate ad plays into a 210 station's inventory spots has been around almost as long as radio has. As mentioned earlier, even today this is almost always done "by hand"/manually, with a highly experienced person determining with pen-and-paper/simple spreadsheets where they can place allocations for a new campaign. A problem is that each campaign has specific and differing placement and sizing requirements from the next campaign. The result is that the campaigns form a patchwork on the 210 stations' inventory that breaks up the inventory into unusable remnants. As mentioned before, in some cases this can lead to 20% to 30% of a 210 station's inventory going unfilled by paying advertisers 202 each week.

Broadcast vs Online Media.

Generic scheduling/allocation systems or ad-delivery processes used in mediums other than broadcast are not the same as the broadcast inventory-fill problem. There are several unique characteristics of the broadcast ad distribution problem. In online media (for example browser/websites and/or phone apps), ads are directed at individual people with known demographics. By contrast in broadcast, an ad reaches thousands of people simultaneously (usually publically), creating a demographic pattern of impressions. In online media, the upcoming amount of impressions is not guaranteed because one may not be certain of how many people of each demographic will visit a website or smartphone app. By contrast in broadcast, the number of impressions is effectively guaranteed because the industry has settled on official estimates of listenership based off of sampling polls.

Sidecar Appliance.

Figure 4A:
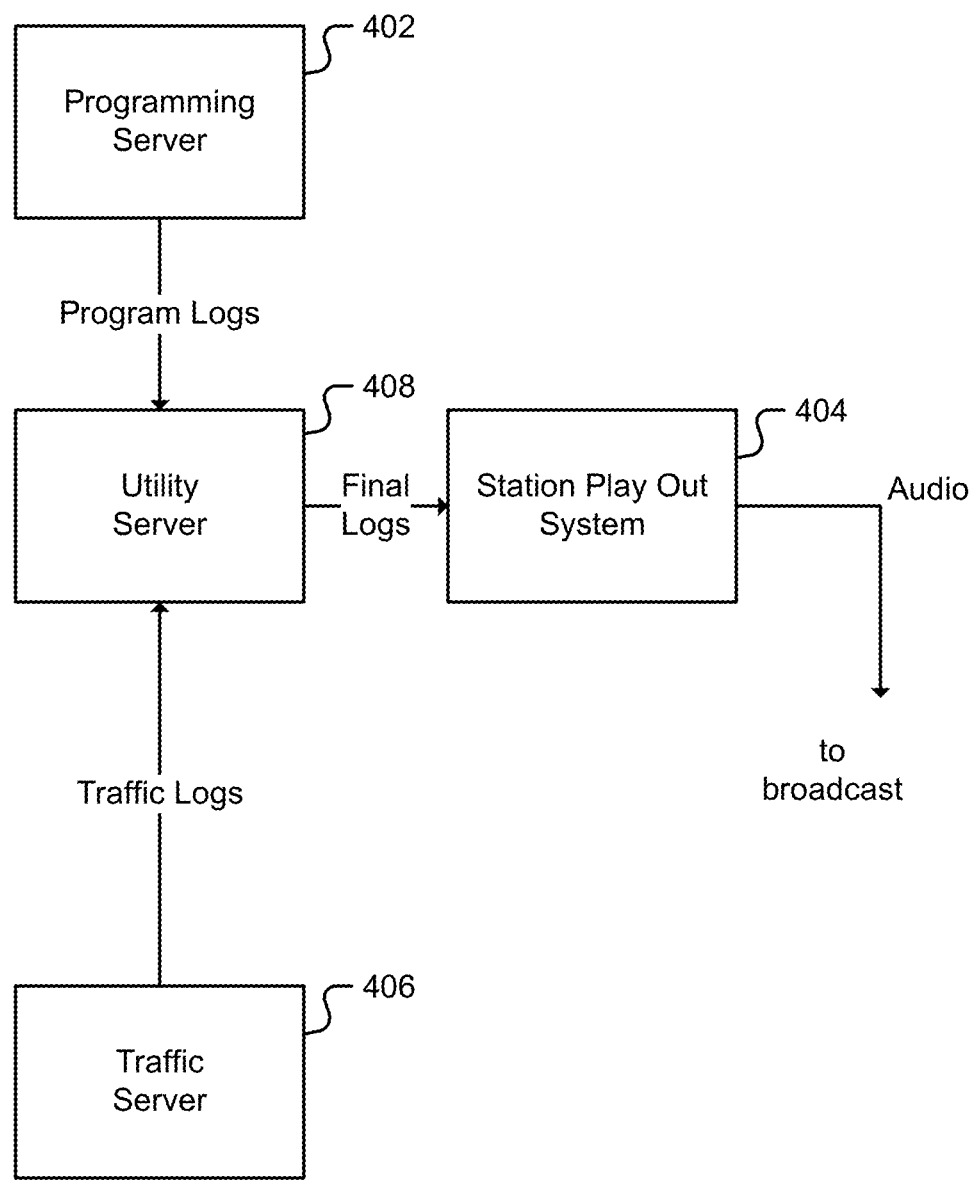
FIG. 4A is a block diagram illustrating a traditional broadcast system.

FIG. 4A is a block diagram illustrating a traditional broadcast system. The system of FIG. 4A may be at a station 210. In the example shown, 402 is a programming server. Throughout this specification, "programming" refers to core content of the broadcast station, usually content that is more valuable for broadcast consumers, for example listeners or viewers of the broadcast. Throughout this specification, "server" refers without loss of generality to either an internal or external system/platform and may be implemented in software and/or hardware. Thus, a utility server 408 and station play out system 404 may be housed within a single computer as shown in FIG. 1.

A programming server typically has access to pre-recorded or live programming content to be interleaved with traffic and/or ad content. Programming server 402 is coupled with a utility server 408 via program logs, which are generally human-readable files, for example text files, that indicate log book and/or timing details for "carts", which are cartridges and/or unique identifiers for specific creative pieces, including programming, commercials, weather, news, top-of-the-hour announcements, and other programming. For example cart COM-2537 may be a 30-second advertisement for a national home-improvement store with a 10% promotion. Program logs contain information on carts like PRO-1024 which may be a Top 40 popular song that happens to take three minutes and fifty-one seconds. The program logs may also store information for disc jockeys (DJs) such as artist, title, track, rotation, and trivia information about the cart.

Similarly, traffic server 406 provides traffic content. Throughout this specification "traffic" content refers to content other than programming, for example traffic reports, weather reports, local news, FCC mandated spots, such as top-of-the-hour, and local/network/national ad spots. Traffic server 406 is coupled to utility server 408 via traffic logs. Traffic logs contain information on carts like the example of COM-2537 above, or WEA-1100 which may have the eleven o'clock weather report for forty-five seconds.

Utility server 408 provides a merge and/or continuity function to form final logs that are the program logs from programming server 402 and traffic logs from traffic server 406 merged for final play out. The final logs are submitted to station play out system 404, also known as a primary play out system, or an automation system. Without loss of generality, the automation system may include both utility server 408 and play out system 404. The play out system has an audio codec and the capability to directly push content to broadcast.

Typically logs, based on schedulers' log books, are generated a day prior to a broadcast airing and have a predetermined schedule of triggering traffic via the play out systems 404 and 408. This is an issue in that logs are static by being generated so early, and that audio copy may not be changed in real time.

Figure 4B:
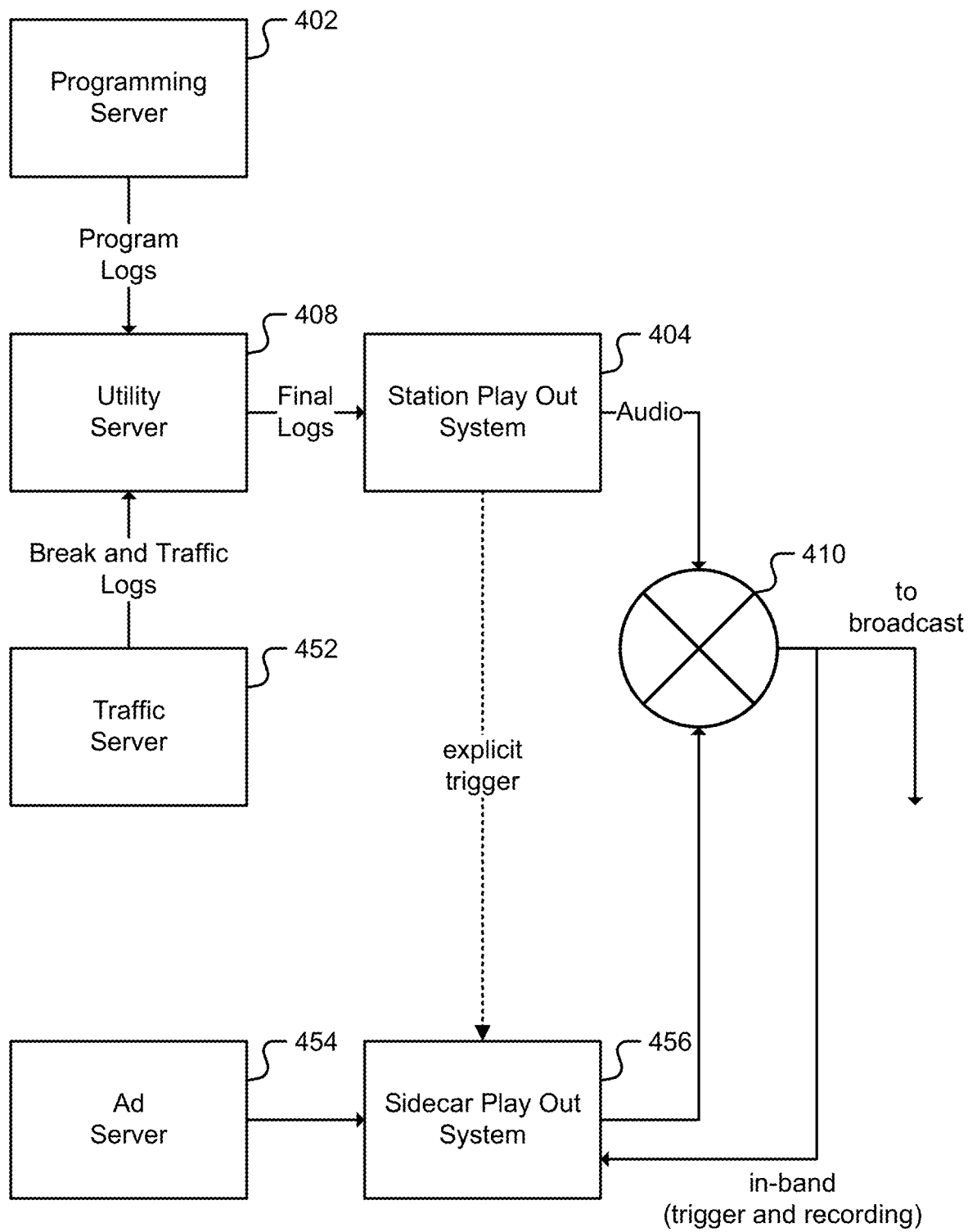
FIG. 4B is a block diagram illustrating an example of a sidecar-appliance broadcast system.

FIG. 4B is a block diagram illustrating an example of a sidecar-appliance broadcast system. The system of FIG. 4B may be at a station 210 affiliated with ad network 206. The sidecar appliance permits ad network 206 to trigger and play spots at station 210 in real time. In the example shown, similar to FIG. 4A, programming server 402 is coupled with station play out system 404 via utility server 408 which is coupled with mixer 410. One traffic server 452 providing, for example, commercial breaks, traffic, and weather reports, is also coupled with station play out system 404 via utility server 408 to provide some but not all of the traffic content for broadcast, and it leaves room for another traffic server using "break" logs.

In one embodiment, the station automation system 404 explicitly triggers the sidecar 456 by way of physical (relay) closures, serial/parallel port signaling, TCP/IP triggers, and so forth, shown as a dotted line in FIG. 4B. To provide universal interoperability with the sidecar 456, the station automation system 404 that cannot or will not provide external triggers is given another option to use in-band trigger techniques. Another traffic server, also known as an ad server 454, is coupled with another second play out system 456. In one embodiment, the ad server 454 is a cloud based platform, wherein cloud refers to cloud computing. Cloud computing refers without loss of generality to the practice of using one or more remote servers hosted on a computer network, for example the Internet, rather than only using local servers and/or local personal computers. Although traffic server 454 is depicted as an ad server, without loss of generality the same in-band trigger techniques may be used for non-advertising content. Because sidecar play out system 456 has its own audio codec, and ad server 454 may be cloud computing based including associated with the internet, it provides a way for media creative to be loaded and scheduled in real time to be merged with the day-old programming logs of a traditional broadcast.

Furthermore, because sidecar play out system 456 can listen to in-band program audio, it can provide real time compliance data to a cloud platform, for example ad server 454. This allows an advertiser 202 or ad agency 204, to verify a creative spot was played in full, what time it was played, when it was played in the logs (for example what program was played prior to the creative spot being played), and the frequency it was played. Sidecar play out system 456 does not need to have an auxiliary network for triggering but may rather directly monitor the output of mixer 410, in-band. When sidecar play out system 456 detects and decodes an in-band trigger, it directly plays content based on instructions and audio copy from ad scheduling server 454 to mixer 410 and out to broadcast.

Improving on the Manual Process with the Sidecar Appliance.

Thus in one embodiment, a real-time media-delivery sidecar appliance 456 is installed in over a hundred broadcast stations 210. Each broadcast station 210 may then be affiliated with one or more ad networks 206. This allows delivery of a selected ad to the right spot directly into the radio/television broadcast station's broadcast stream at nearly any desired time. Thus, serving ads from the appliance computer permits a near immediate reactiveness to desired additions, changes, and removals in ad campaigns. This level of proactiveness/reactiveness is not at all practical in the "by hand"/manual approach.

That is, even if a network had an army of people transferring existing placements to attempt to fully fill their network, the complexity may boggle the army of people. The constant stream of ad-placement changes would have to be communicated to independent people at hundreds or thousands of radio stations; and not only would these people reject the idea of constantly making adjusts, they would not be able to do so reliably. This hypothetical situation is further exacerbated by the fact that a week's inventory is at its worst gridlock just before the week's go-live time.

Thus, the sidecar appliance 456 allows a fresh solution for the inventory-fill problem at a detailed level that only an automated system/computer can handle, rather than with the traditional broad-stroked methods that a person or persons can realistically apply manually. By computerizing the process, a new tool is forged to dynamically place campaigns' ads in a systemic way that concurrently explores all options and select the best one. The advertising placement system is thus a new problem space for broadcast inventory.

Figure 5:
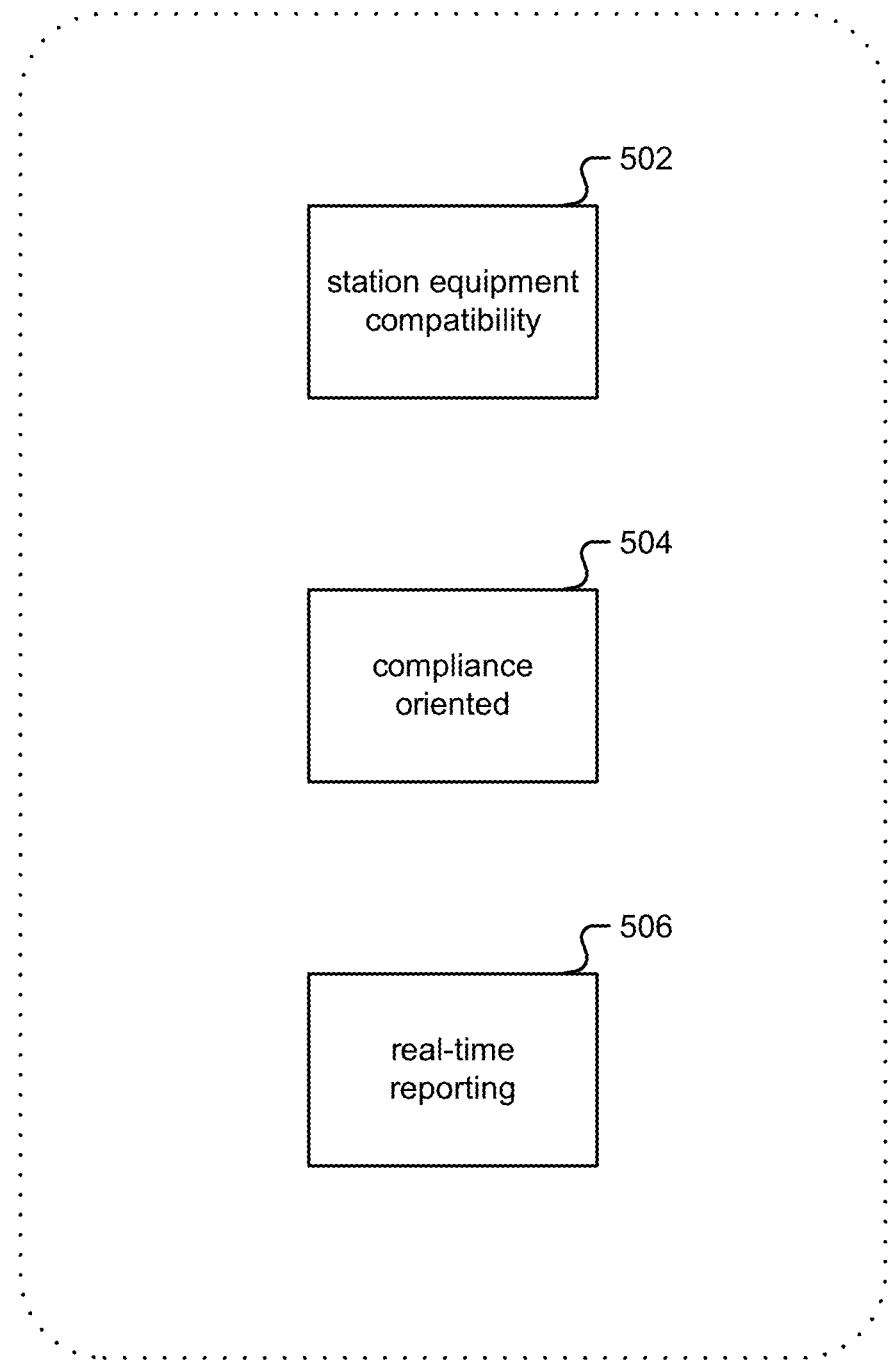
FIG. 5 is an illustration of features for a sidecar appliance.

FIG. 5 is an illustration of features for a sidecar appliance. In one embodiment, the features of FIG. 5 are included in sidecar appliance 456.

One feature of the sidecar appliance 456 is that of station equipment compatibility and/or agnosticism (502). With a history of nearly a hundred years, linear broadcast stations have a range of legacy and modern equipment systems that require sidecar appliance 456 to be compatible with in order to minimize adoption of adding sidecar appliance 456 to the station. Rather than replace a piece of equipment at a station, the philosophy of the sidecar appliance is additive; it is meant to be an additional piece of equipment that is fully compatible with the mixer/audio chain at a broadcast station without additional configuration and setup for station staff beyond interconnecting the audio cables.

In one embodiment, having a 'universal' compatibility scheme involves having a simple input/output model. In one embodiment, sidecar appliance 456 has a simple trigger input compatible with any trigger mechanism used in linear broadcast stations including but not limited to: physical (relay) closures, serial/parallel port signaling, TCP/IP triggers, audio trigger 1.1, audio trigger 2.0, and XML, for example those disclosed in U.S. patent application Ser. No. 14/576,067 entitled AUDIO EVENT TRIGGERS FOR BROADCAST filed Dec. 18, 2014 which is incorporated herein by reference for all purposes.

In one embodiment, sidecar appliance 456 has a simple audio output compatible with any automation play out system as it uses an analog/digital audio output capable of broadcast quality output for mixing with local program audio, and then transmission to the audio chain, including the studio transmitter link (STL). In that way, any automation systems, regardless of company and version, has at least one technique to communicate break triggers with sidecar appliance 456. By contrast, it does not require any radio station to replace any automation system. Thus, sidecar appliance 456 is compatible with every automation play out system including but not limited to: AudioVault AVAir (9.2, or earlier); AudioVault AVFleX; Axel Technology DJPro Enterprise; BSI Simian 2.1 Lite; BSI Simian 2.2 Pro; Dial Global STORQ; Digilink-HD; DRS 2006; Enco DAD; iMediaTouch; Maestro; RCS Master Control; RCS NexGen Digital; RCS Zetta Radio Automation; Rivendell Radio Automation; Scott Studios 32; WideOrbit for Radio Automation; and ZaraStudio 2.

In one embodiment, sidecar appliance 456 is agnostic to station equipment compatibility in part because it is responsive to the mixer/audio chain from analog/digital audio through to STL and/or transmitter/studio link (TSL). This includes understanding and/or processing anything from the feed to the mixing point 410 including the seven-second/profanity delay, PPM, compression for gain control/normalization, silence detection, and signal processing/filtering for example a 15 kHz filter for FM radio.

One feature of the sidecar appliance 456 is that of compliance (504). As an example of non-compliance, take a traditional advertising system for linear broadcast wherein a station staff member is to manually insert a fast food advertiser's ad for a 12:30 pm spot, wherein the fast food advertiser has explicit instructions to have a specific lunch ad play only between noon and 1 pm. Because of the manual nature of insertion, a junior staff member may easily make the mistake of inserting the lunch ad at a 3 pm spot, for example by dragging and dropping the cart for the lunch ad on the 3 pm spot.

By contrast, a sidecar appliance 456 provides a 'vault' for audio in that a local station cannot alter the audio and/or produce the audio. The sidecar appliance 456 does not allow for the lunch ad to play outside of noon and 1 pm. The station staff may only drag and drop a "sidecar" generic ad to the 3 pm spot, wherein the sidecar appliance 456 dynamically determines what the generic ad will be based on time of day and/or other data.

In one embodiment, a role-based access and/or hierarchical security scheme is used to protect the sidecar appliance 456 such that station staff 210, station group staff 208, ad network staff 206, ad agency staff 204, and advertiser 202 are given limited and/or unlimited access to the ad creative as is reasonable in a business sense and/or agreed upon by contract. In one embodiment, buffers and/or memory are used on sidecar appliance 456 to handle short-term loss of network connectivity and/or power, for example using a local audio cache, and retains, can generate, or supports: copy instructions and schedule, audio playback, air-checks, streaming support, automation support, and multi-tenancy support for over a million networks. In one embodiment, the sidecar appliance 456 is designed for robust always-on connection.

Another example of compliance is centralized deployment of each ad creative. Unlike traditional methods without a sidecar appliance and/or cloud platform wherein an advertiser 202 and/or advertising group 204 must upload audio creative to a plurality of access points, instead they upload to a single point. For example, an advertiser 202 and/or advertiser group 204 may have a creative with a unique identifier, for example a unique Ad-ID and/or ISCI (Industry Standard Coding Identification).

In one embodiment, sidecar appliance 456 may catalog the creative with an audio fingerprint. In one embodiment, the audio fingerprint and/or audio watermark uses a modulation scheme such as DTMF or GSK in less audible frequencies and/or less audible amplitude and/or quieter parts of the creative so that a recording device may identify when the creative is played. In one embodiment, the audio fingerprint/watermark is established for each version of a creative (i.e. version 2, version 3, and so on) and around the same time the fingerprint processing "trims the slate" to remove all version identification from the advertiser 202/ad agency 204 itself.

In one embodiment, the ad server 454 and/or sidecar appliance 456 properly recognize the unique identifier and propagate new and/or changed creative by ISCI and automatically propagate the creative by its ISCI to all sidecar appliances 456 in all broadcast stations 210 near simultaneously.

One feature of the sidecar appliance 456 is that of real-time reporting (506). Unlike traditional broadcast ad insertion, the sidecar appliance 456 includes the ability for real-time recording of the station 210, for example around the mixer 410 as shown in-band in FIG. 4B. This permits the establishment of an audio affidavit to an advertiser 202 and/or ad agency 204 to indicate which and when an ad creative is played at a station 210. This audio affidavit may be produced near real-time after an ad creative is played.

In one embodiment, the audio fingerprint/watermark is decoded so that the ad creative is identified. In one embodiment, the audio fingerprint is decoded so that it also can establish which version of an ad creative was played. In one embodiment, the recording of sidecar appliance 456 may be "always on" searching for audio fingerprints constantly, so that even if a creative were to be sourced from an alternate and/or additive source, the sidecar appliance 456 would produce an audio affidavit.

In one embodiment, audio affidavits are collated and/or collected and then appropriately presented to an advertiser 202/ad agency 204 with the appropriate credentials by way of an advertiser dashboard portal. In one embodiment, audio affidavits are also presented to a station 210/station group 208/ad network 206 with the appropriate credentials by way of a publisher dashboard portal.

Figure 6:
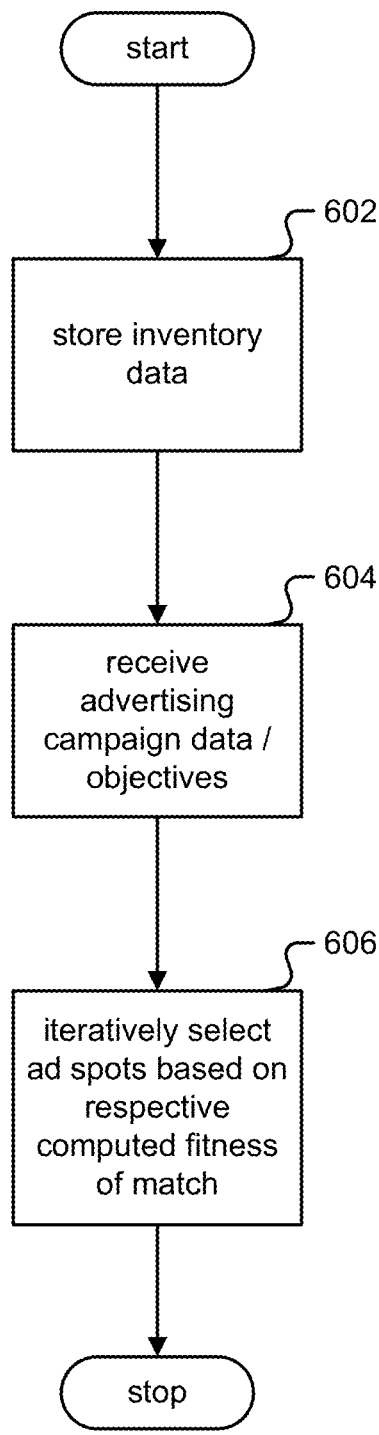
FIG. 6 is an illustration of a flow chart for a dynamic advertising placement.

FIG. 6 is an illustration of a flow chart for a dynamic advertising placement. In step 602, inventory data is stored, wherein the inventory data represents for each of a plurality of broadcast stations 210 a corresponding inventory of audio advertising spots available from that broadcast station 210 to be filled by an advertising placement system. In one embodiment the advertising placement system is run at a programmatic ad network 206 as shown in FIG. 2.

In step 604, an advertising campaign data is received from advertiser 202 and/or ad agency 204, wherein the advertising campaign data represents a set of advertising objectives of an advertising campaign.

In step 606, the inventory data is used to iteratively select advertising spots to be associated with the advertising campaign, based at least in part on a respective computed fitness of match between each selected advertising spot and said advertising objectives. In one embodiment the computed fitness of match comprises a primary metric comprising at least one of a demo-match metric and a price efficiency metric. In one embodiment, the computed fitness of match comprises the primary metric and a secondary metrics. In one embodiment, a secondary metric is transformed to a normalized value, for example a value normalized into financial terms such as price, cost, ROI, and so on. In one embodiment, a normalization strategy includes normalizing them all into financial terms so they can be combined together in a meaningful way to get the overall fitness. In one embodiment, the price efficiency metric is evaluated by efficiency in demo impressions for a given amount of money. In one embodiment, being evaluated by efficiency also comprises a bias to achieve a daypart distribution, for example the bias is remnant prorated. In one embodiment, being evaluated by efficiency also comprises an overall fitness including price efficiency and region distribution fitness.

In an additional step (not shown in FIG. 6) advertising spots are dynamically re-selected to be associated with the advertising campaign based at least in part on one or more of the following: a change in inventory and/or a subsequently processed campaign; recomputing the respective computed fitness of match, including at least one of: recomputing aggregated fitness and recomputing overall fitness; and to attain a same or equivalent fitness of match.

In an additional step (not shown in FIG. 6) the advertising campaign is globally optimized with a second advertising campaign. Such a globally optimization comprises at least one of: optimizing at least one of a supply side and a demand side across both advertising campaigns; achieving objectives of both advertising campaigns collectively with a maximum fill of ad spots; and/or achieving objectives of both advertising campaigns collectively with a maximum ROI to the plurality of broadcast stations.

As described above, the technique in FIG. 6 may be carried out by a computer as shown in FIG. 1 coupled by a network connection to a plurality of sidecar appliances 456 in each of the plurality of broadcast stations 210.

Figure 7:
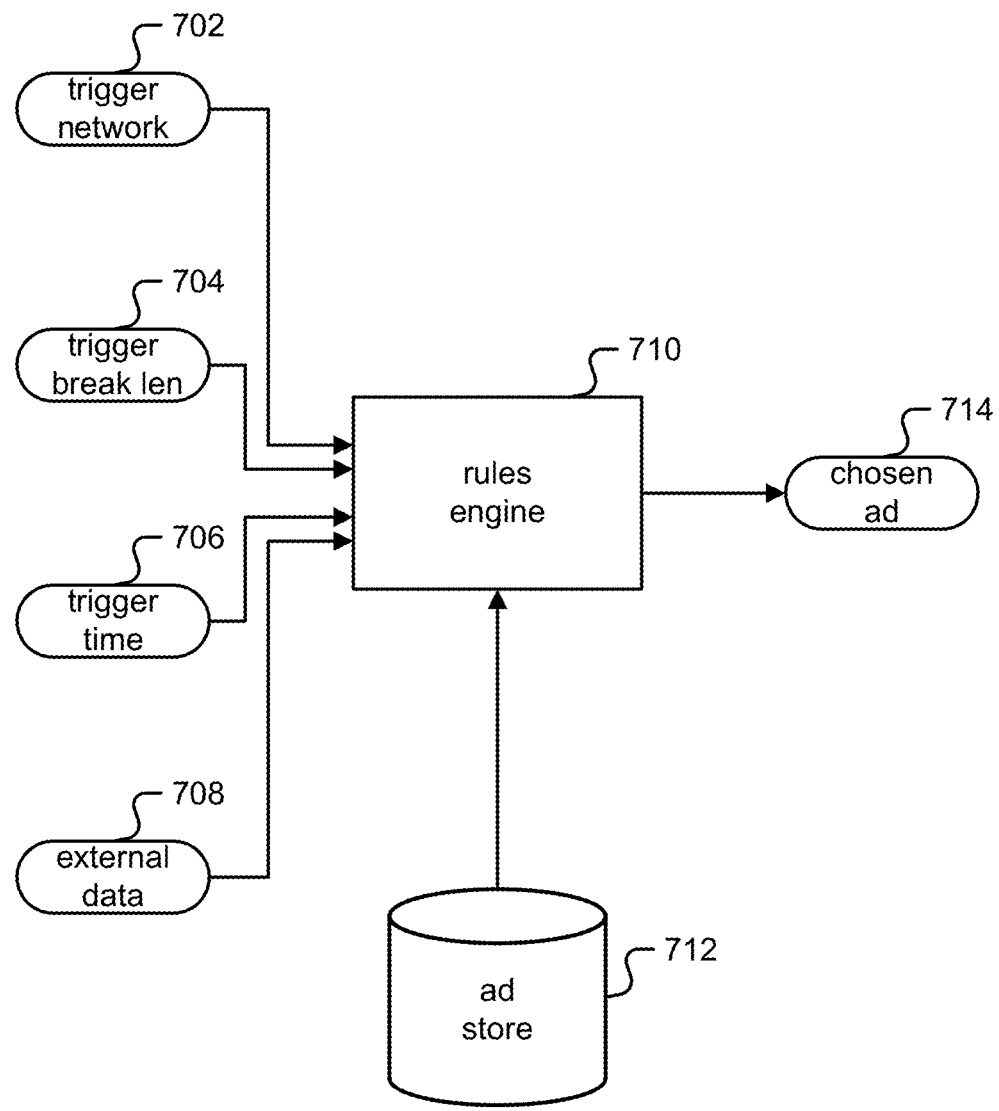
FIG. 7 is a block diagram illustrating a rules engine for a sidecar appliance.

FIG. 7 is a block diagram illustrating a rules engine for a sidecar appliance. In one embodiment, the rules engine depicted in FIG. 7 is executed by processor 102 in FIG. 1.

When a trigger is received from station automation system 404, either explicitly for example via network interface 116 or in-band via audio interface 122, the trigger is decoded. Triggers traditionally carry at least three pieces of information: a network and/or exchange identifier 702, a break length 704 usually 30 s or 60 s, and implicitly or otherwise the time/date of the trigger 706. Network interface 116 may also provide external data 708, for example events data that describe one or more environmental conditions, for example the weather, concurrent sports events, concurrent political events, concurrent running programs, programs the station 210 is affiliated with, and so on.

Rules engine 710 takes the inputs 702, 704, 706, 708 and applies rules to the inputs dynamically to provide an ad from ad store 712 to choose for broadcast insertion 714. That is, instead of a playlist being fed into sidecar appliance 456 by ad server 454, a rules engine 710 is used to provide a dynamic determination of ad copy and/or ad playlist. The rules engine includes rules based on:
1. avoidance of radio silence;
2. rotation information with regards to an ad creative, advertiser 202, and/or ad agency 204, and an indication as to whether they are marked for 'fair and equal' rotation;
3. governmental regulations;
4. pacing information with regards to an ad creative, advertiser 202, and/or ad agency 204 with regards to the day of the week in relation to a campaign;
5. explicit instructions regarding an ad creative, advertiser 202, and/or ad agency 204, for example to never play a lunch ad after 1 pm;
6. production and/or direction from ad server 454;
7. using day of week to determine whether and which ad creative to play, for example to choose a home improvement ad only on a weekend;
8. using weather events to determine whether and which ad creative to play, for example to choose an umbrella ad only during a rainy day;
9. using political events to determine whether and which ad creative to play, for example to choose a political party ad during their convention;
10. using sports events to determine whether and which ad creative to play, for example to choose a sports team ad during their playoff game;
11. using concurrent programming event to determine whether and which ad creative to play, for example never to play an ad during a conservative talk show host program; and
12. using affiliated programming event to determine whether and which ad creative to play, for example never to play an ad ever while a station plays at any time during the week a conservative talk show host program.

In one embodiment, other examples of rules include rules based on:
1. time;
2. separation of advertisers;
3. optimizing for price;
4. optimizing for break length. For example, a 60 sec break length could play two 30 sec spots, or one 60 sec spot, if a 60 break comes in, the rules may determine that the break be filled with a 60 sec spot;

5. third party data may provide real time events like weather, auto traffic, sporting event results; and
6. music that just played prior to the ad.

In one embodiment, the rules engine 710 and/or appliance 456 software fetches a "playlist group" JSON from the cloud, for example an ad exchange, and stores it in storage, for example RAM. The playlist group contains a collection of playlists and a collection of triggers. Every playlist contains a sequence of medias and effects. Every media and effect has a specific time offset. After a playlist is activated, the software plays the medias and renders the effects at their time offset. Example of effects are STOP that ends media playback, or RELAY that generates an event.

In one embodiment, a trigger contains a time range, a trigger string, and a sequence of playlists. When the software receives an incoming trigger string, it finds the trigger whose time range contains the timestamp of incoming trigger string, and activate the first playlist in the trigger's playlist sequence. Once a playlist is activated, it is removed from the trigger's playlist sequence.

In one embodiment, if a trigger is not available for an incoming trigger string, a backup playlist is used to avoid dead air. For example, non-profit messages and or public service announcements (PSAs) may be used to avoid dead air. Multiple trigger strings in the playlist group provides the flexibility of using multiple media lengths and multiple campaigns.

In one embodiment, the rules engine 710 and/or appliance 456 software periodically contacts the cloud, for example an ad exchange, for new playlists. The backend releases new playlist groups to the appliances when the previously released playlist groups are about to run out, or when responding to events, such as campaign modification, or media change triggered by condition such as weather. The playlist group update can also be used to transfer ad serving from under triggered stations to over triggered stations to increase compliance.

There are various embodiments to implement the features in rules engine 710 and/or appliance 456 software.

In one embodiment, provisioning and/or authentication for an appliance is performed by installing an Ubuntu and/or other Linux package that contains a username/password pair used for device authentication. For third party devices, one example of a secure way to provision them is that the device sends its login and password to the server and the server returns an authentication token. For subsequent requests, the token is sent along as the value of the authentication token cookie. The station configuration file contains the login, password, and server name. For example, the login and password may be used to get a security token by HTTP POST request.

In one embodiment, a playlist contains audio media playback instruction. Multiple playlists may be stored in a playlist group. The appliance 456 may obtain a playlist group from a server using an authentication token, then act according to the instruction. The device may use an HTTP POST request to fetch a playlist group. The playlist group request body may be a JSON object In one embodiment, the semantics of the playlist may include the following:

A playlist group may be stored in a JSON object with the following members:
action: "deviceGetNewPlaylistGroup". The action used to fetch the playlist.
result: true/false. Whether playlist fetching is successful.
serverName: The server that served the playlist request.
serviceUri: "/services/station/device".
playlistGroup: A group of playlists.

The playlistGroup may be a JSON object with the following members:
mainPlaylist: The playlist that is played after the playlist is fetched.
orderedTriggers: A list of triggers. Each entry of the list may be a JSON object with the relay string, a time range in which the trigger is valid, and a list of media id that the appliance plays every time a trigger is received.
timestamp: The playlist generation time.
variationGroups
triggeredPlaylists: A list of playlists that the appliance plays as response to received triggers.
playlistGroupToken: An opaque data that the appliance sends along with the next playlist request.

In one embodiment, after receiving a playlist group, the appliance accepts or rejects the playlist group with HTTP POST request, depending on whether the appliance can download the media files referred in the playlist group.

To accept a playlist group, the HTTP POST request body may be a JSON object with the following members:
action: "deviceAckPlaylistGroup"
playlistGroupId: the playlist group id. The lower 16 bits are the playlist id of the main playlist in the playlist group. The higher 48 bits contains the timestamp of the playlist group.

To reject a playlist group, the HTTP POST request body may be a JSON object with the following members:
action: "deviceRejectPlaylistGroup"
playlistGroupId: the playlist group id
reason: a string explaining the reason of rejection.

In one embodiment, if the appliance fails to download playlist or media for an extended time due to power issues, network issues, and so forth, it might run out of ads to play. Under such a situation, the appliance may play public service announcements when it receives triggers.

In one embodiment, the appliance caches the media locally to: (1) start playback when it receives a trigger. (2) in the event it loses network connection at any time. To cache the media files, the appliance may request the next download from the server. The body of the HTTP POST request is a JSON object with one member:
action: "deviceGetNextDownload The server may return a JSON object containing the following members:
action: "deviceGetNextDownload"
duration: length of the media in milliseconds
mediaId: id of the media
permanentUrl: URL for downloading the media
result: true/false indicating whether the call is successful
serverName: name of the server that returns the result
tempUrl: another URL for media download. The URL includes query string that is used to authorize the download.
"type":"STATION_CLIP The appliance may check for the next download periodically, and caches the media file using the returned tempUrl. The appliance may ensure all media referenced in a playlist group has been cached locally before accepting.

In one embodiment, the appliance gets a manifest from the server. The HTTP POST request may send a JSON object with the following members:

action: "deviceGetManifest"
addMediaIds: an array of IDs of media
addMediaUrls:
removeMediaIds:

In one embodiment, the appliance updates the server periodically on the cached media status. The HTTP POST request sends a JSON object with the following members:
action: "deviceUpdateManifest"
addMediaIds: an array of IDs of media added to the cache
addMediaUrls: an array of URLs corresponding to the media being added
removeMediaIds: an array of IDs of media removed from the cache In one embodiment, the network trigger handling software monitors the network trigger port. The radio station automation software connects to the port to write the trigger string. The network trigger port is specified in the appliance configuration file.

In one embodiment, the network trigger handles the incoming data one line at a time. So a trigger string should end with a new line character. The beginning of the string in various embodiments is "jelli_". One example of a valid network trigger is "jelli_30", whereas "30 seconds" is not a valid network trigger and is discarded by the handler. An optional dictionary can be used to map the network trigger string to the jelli trigger string. A jelli trigger string is a string representation of a 24-bit unsigned number. The appliance the searches the playlist for the jelli trigger string for medias to playback.

In one embodiment, the appliance reports the received triggers and the playback activity to the server for compliance checking. The trigger may be reported by the device report relay's HTTP POST request including JSON object with the following members:
action: "deviceReportRelays"
relays: an array of relay event JSON objects. A relay event JSON object has the following members:
"relayString: the network relay string
mappedRelayString: the jelli relay string
epochTime: time of the relay in milliseconds since epoch(1/1/1970).
success: true/false indicating if the relay handling was successful
relayType: "network"

In one embodiment, the appliance reports playback by the deviceSetOnAir HTTP POST request. The body of the request may be a JSON object with the following members:
action: "deviceSetOnAir"
mediaId: media ID
startTime: start time of the playback
currentTime: report start time
token: the set_on_air_token of the media. The value is copied from the playlist.

In one embodiment, the appliance reports the end of playback by the deviceSetOffAir HTTP POST request. The body of the request may be a JSON object with the following members:
action: "deviceSetOffAir"
mediaId: ID of the media played
startTime: playback start time
stopTime: playback stop time
currentTime: time of appliance making the HTTP POST request In one embodiment, the appliance may report onAir and offAir by a deviceSetOnAirOffAir HTTP POST request. The body of the request may contain the following members:

action: "deviceSetOnAirOffAir"
mediaId: the ID of the media played
startTime: playback start time
stopTime: playback stop time
currentTime: time of appliance making the HTTP POST request
token: the set_on_air token of the media. The value is copied from the playlist.

In one embodiment, the appliance reports errors to the server. The HTTP POST request may contain the JSON object with the following members:
action: "deviceReportError"
type: a string for the type of the error
details: a string for the details of the error In one embodiment, when a valid trigger is received, the appliance searches its playlist group for the media to play. Since all the media files may have been cached locally when a playlist group was accepted, the appliance plays the media file from local cache. If no instruction is provided for the received trigger, the appliance plays backup media.

In one embodiment, the appliance continually records the incoming audio from the console. The ads played by the appliance are included in the recording. The audio snippets, or the recording around the ad, are uploaded to the server for proof of play as an audio affidavit.

Ad Exchange on Ad Server.

There traditionally is no ad exchange, wherein an "ad exchange" is defined throughout this specification as a space comprising demand and supply participants, traditionally available that is integrated and running on top of a real time ad server platform for linear broadcast, including linear broadcast radio or linear broadcast television. A linear broadcast ad server and/or enabling inventory to be dynamically supplied to exchange buyers to purchase is disclosed. The term "dynamically supplying" refers to supplying last minute and/or non-last minute inventory, freely changing the amount of inventory, freely changing the break lengths, and so on. In one embodiment, even pre-purchase and/or non-guaranteed inventory is supplied if it becomes available. In one embodiment the creative to run on broadcast may be supplied seconds and/or minutes after an order. In one embodiment high compliance is accounted for. In one embodiment, real time reporting, and real time invoicing are made available.

Inventory is allowed to be submitted to an ad exchange via a variety of methods that permit automation, including without limitation: application programming interfaces ("APIs"), applications, and direct interfaces. Buyers are allowed to purchase available inventory via a variety of methods that permit automation, including without limitation: APIs and direct buying interfaces. Proposals are created programmatically to buyers using buyer and seller rules and criteria. Once an order is placed, the campaign may run on all stations (via an appliance ad server) according to the specifications, creative, instructions, and so on.

When spots play out of the appliance ad server, the appliance reports the playtime and automatically confirms the spot play in lieu of traditional manual station affidavits or proof-of-performance reports. Campaign performance is provided to agencies and advertisers in real time, which also improves the efficiency of billing. Importantly, a programmatic exchange running on top of a cloud based, real time, ad server, enables efficiencies that are not possible manually using the traditional methods of using many people, disparate systems, and/or antiquated manual processes. With data, processing algorithms, and the ability to analyze, optimize, and re-plan every proposal/plan as new proposals/plans come in, value is added to all exchange participants—providing fair pricing to suppliers and buyers alike. Another strength over traditional exchanges is the disclosed exchange may work for many or a majority of all media groups.

In one embodiment, the ad exchange on ad server gets remunerated based at least in part on delivery of spots and SaaS/PaaS (Software as a Service/Platform as a Service) types of fees based on access to the exchange. Such a system is significant because of: a) the real time nature of the exchange; b) the benefits to both buyers and sellers; c) the assurance of buyer specifications, compliance, and control of copy; and d) the fact that traditionally is no industry wide ad exchange available for linear broadcast, or linear broadcast combined with streaming/online.

Figure 8A:
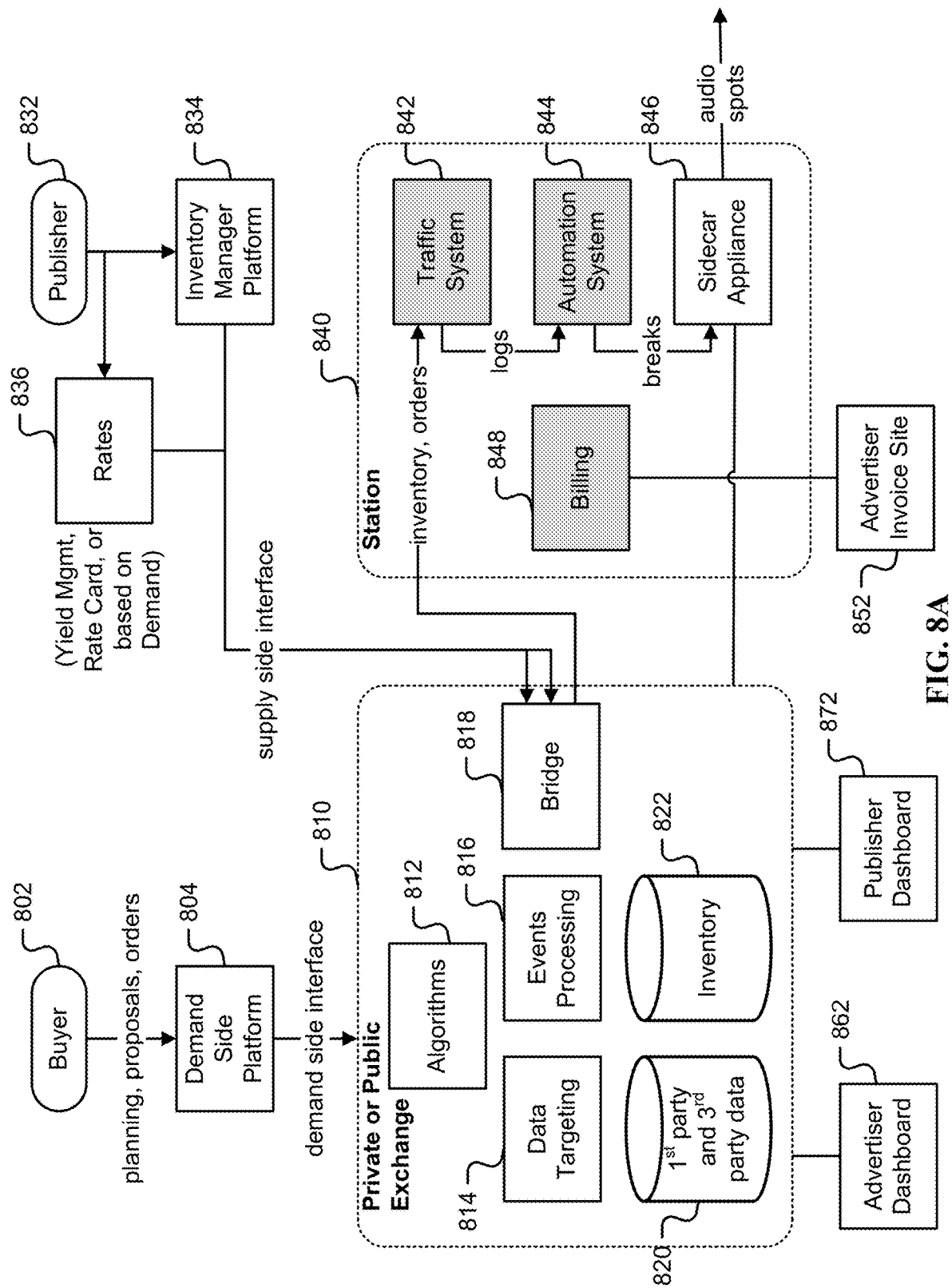
FIG. 8A and FIG. 8B are block diagrams of advertising exchange systems.
Figure 8B:
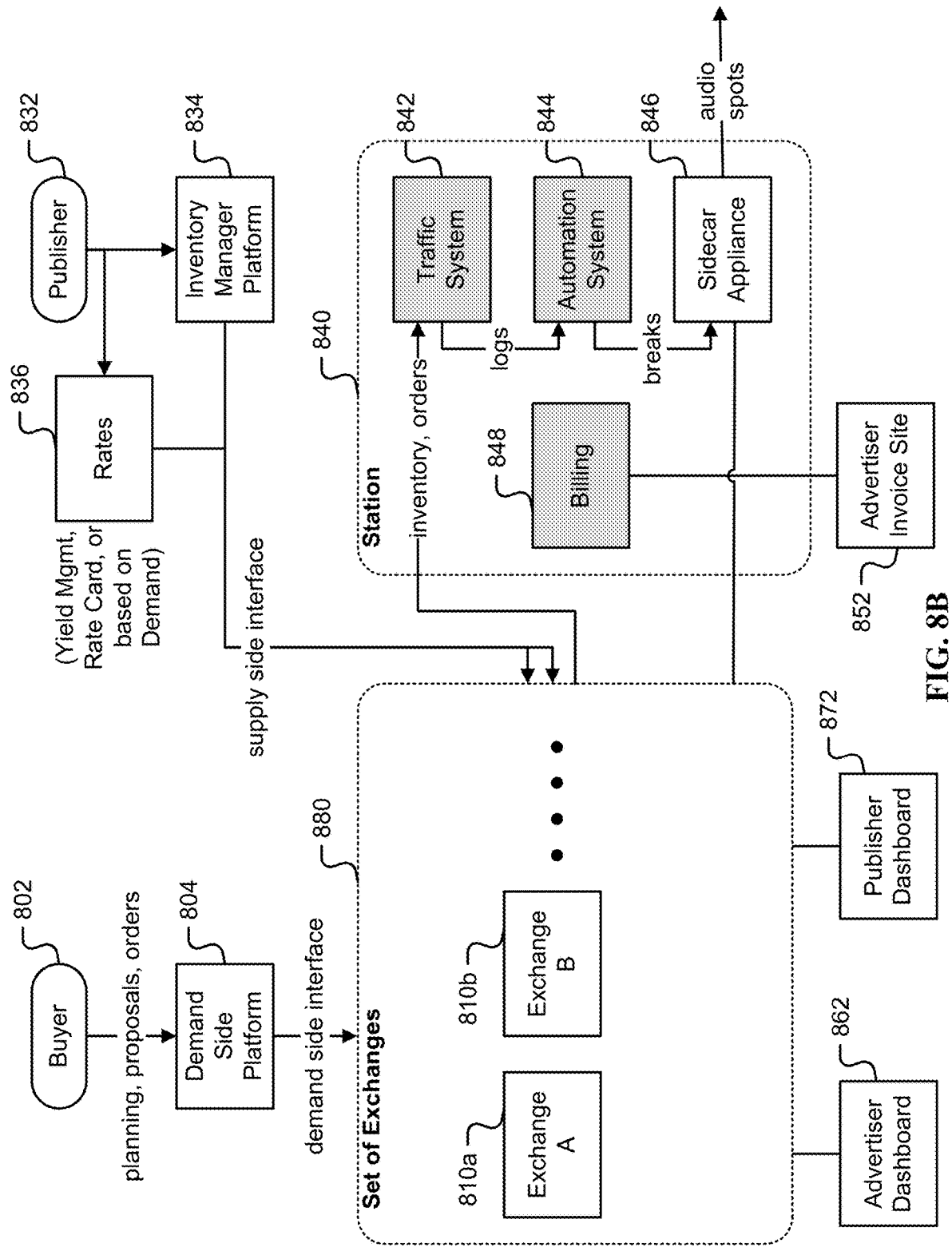

FIG. 8A and FIG. 8B are block diagrams of advertising exchange systems.

In FIG. 8A, Buyer 802 represents an advertiser 202, ad agency 204, and/or an ad network 206/station group 208 assisting an advertiser in purchasing adspace. The Buyer 802 submits campaign planning, proposals and/or orders with a demand side platform 804. Throughout this specification a platform references any programmatic user interface without limitation including a web site, web portal, mobile portal, mobile app, call center and/or computer program. In one embodiment the demand side platform may be represented as two different platforms: a first for an advertiser 202 and/or ad agency 204 to directly interface with, a second for a publisher 206/208 to interface buyers through. The demand side platform 804 interfaces with ad exchange 810 using a demand side interface, comprising programmatic interfaces such as an application programming interface (API), web service, computer protocol, and other automated and semi-automated interface standards.

Ad exchange 810 comprises algorithms 812, for example algorithms for dynamic lineup and/or placement. Algorithms 812 also may use advance techniques such as data targeting 814 to use first party data such as Nielsen data and/or third party data such as that provided by a publisher 820 to enhance targeting with more precise demographics, and so on. Algorithms 812 also may use events processing 816 to enhance delivery by allowing events such as weather events, political events, sports events, and so on to affect delivery and creative selection. The ad exchange 810 may be one or more of: a public ad exchange and a private exchange.

A private exchange 810 is associated with an inventory pool 822 that may be affiliated with a single owned and operated group of stations 210 and sold by the sales channel of that owned and operated group of stations. The ability to purchase on a private exchange usually requires an invitation to the agency 204 or advertiser 202. A public exchange 810 is associated with an inventory pool 822 that is comprised of inventory by a group of stations 210 owned by multiple owners. A public exchange may also require an invitation to agencies 204 and advertisers 202, but in some embodiments may also be completely public and allow any buyer to use a self service demand side platform 804 to purchase inventory from the public exchange 810.

Publisher 832 interfaces with ad exchange 810 using an inventory manager platform 834 to feed inventory 822 in the ad exchange 810. Publisher 832 also provides input in the form of rates 836, whether the rates are based on yield management, a rate card, or an instruction or algorithm to base rates on demand. In one embodiment, the ad exchange 810 takes an instruction/algorithm to base rates on demand and manifests it using algorithms 812 to provide a dynamic and/or responsive rate. The publisher 832 using the inventory manager platform and inputs rates to a bridge 818 on the ad exchange 810 using a supply side interface, comprising programmatic interfaces such as an API, web service, computer protocol, and other automated and semi-automated interface standards.

A station 840 affiliated with publisher 832 comprises preexisting systems, shown in FIG. 8 as grey blocks: traffic system 842 which produces logs for automation system 844, and billing 848 which invoices to an advertiser invoice site 852 for campaigns associated with ad exchange 810. The traffic system 842 interfaces with bridge 818 for generic inventory and orders: in one embodiment, the traffic system is given the number of breaks, the length of breaks (e.g. 30 s or 60 s), and an identifier to associate the order with a programmatic ad network 206 that is associated with ad exchange 810.

Automation system 844 then signals breaks to sidecar appliance 846, which is coupled with the ad exchange and submits audio spots directly for listening. Exchange 810 using the information from sidecar appliance 846 is coupled with an advertiser dashboard 862 for reporting, accounting, and QA to advertiser/buyer 802, and likewise coupled with a publisher dashboard 872 for reporting, accounting, and QA to publisher 832.

FIG. 8B is similar to FIG. 8A but with a set of exchanges 880 that shows for a buyer 802 and/or purchaser 832 the same single demand side interface and/or single supply side interface may be used with the set of exchanges 880, such that internally to the set of exchanges each exchange, shown in FIG. 8B as exchange A 810*a*, exchange B 810*b*, and so forth, interchange information appropriately. Thus, the set of exchanges 880 can manage information to permit a single buy from buyer 802 to be integrated over a plurality of exchanges (810*a*, 810*b*, and so on), and likewise on the supply side.

Figure 9:
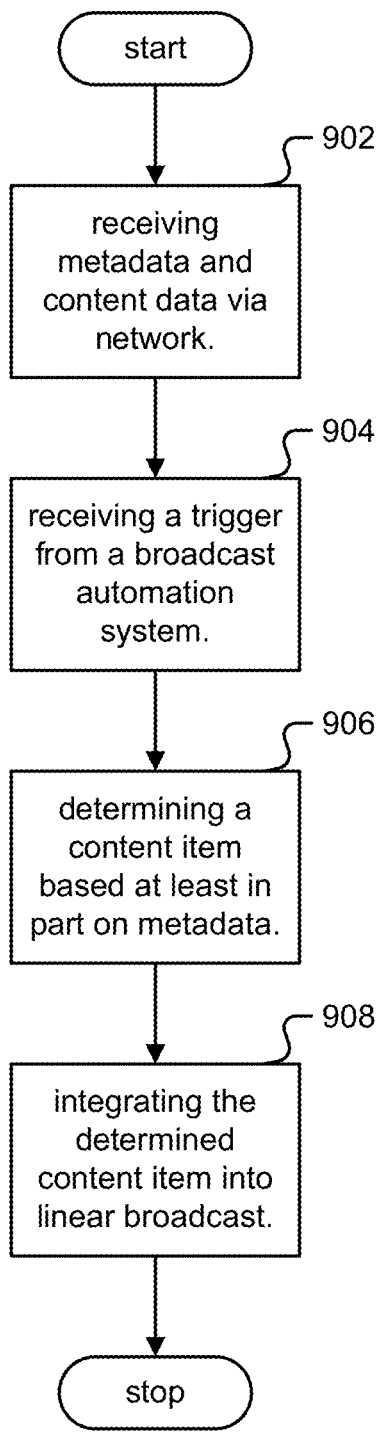
FIG. 9 is a flow chart illustrating an embodiment of a process for sidecar ad insertion.

FIG. 9 is a flow chart illustrating an embodiment of a process for sidecar ad insertion. In one embodiment, the process in FIG. 9 is carried out by the rules engine 710 in FIG. 7 by processor 102 in FIG. 1.

In step 902 one or both of a metadata associated with content to be integrated into a linear broadcast and a content data comprising content to be integrated into the linear broadcast is received via a network. In one embodiment, the communication interface 116 is a Ethernet interface to the Internet and is coupled via the Internet and/or cloud-based node adserver 454 and/or ad exchange 810. In one embodiment, the content data is an ad creative originating from advertiser 202 and/or ad agency 204. In one embodiment, the cloud-based node 454/810 is configured to optimize reception across a plurality of appliances, each at a different linear broadcast node 210, for example with a centralized copy of an ad creative.

In one embodiment, the metadata includes campaign data for the ad creative, for example a target demographic, a target date/time for play, a price, any campaign target metrics including data that is used to compute a fitness of match, such as a demo-match, price efficiency metric, or secondary metrics, responsive metrics to events processing 816 including weather, politics, and/or sports, third party demographics data, competitor-related data such as other advertisers not to play back-to-back, programming-related data such as talk show hosts not to play alongside or ever on the same station, and so forth.

In step 904, a trigger to integrate content into said linear broadcast is received from a broadcast automation system 404 associated with the linear broadcast. In one embodiment, the trigger is at least one of the following: an audio trigger, a physical relay closure, a serial/parallel port signaling, a TCP/IP trigger, and an XML trigger. In one embodiment, the trigger includes at least one of the following: an associated network/exchange 702, a break length 704, and a trigger time 706.

In step 906, it is determined based at least in part on said metadata a content item to be integrated into the linear broadcast in response to the trigger. In one embodiment, the determination is made by also considering external data 708, such as those that describe one or more environmental conditions, for example the weather, concurrent sports events, concurrent political events, concurrent running programs, programs the station 210 is affiliated with, and so on. In one embodiment, step 906 is made by rules engine 710 as described in FIG. 7.

In one embodiment, this determining step comprises using said metadata to indicate a set of instructions to be interpreted and applied dynamically, as opposed to using said metadata as a (static) ad playlist, for example: using said metadata for external data, time of day, date, and/or other context data, using it with a set of rules, using rule engine 710 to apply the set of rules to determine ad copy dynamically, locally enforced show targeting, locally enforced show exclusion, and a programming schedule change.

In step 908, the determined content item is integrated and/or inserted into the linear broadcast, including by providing to a mixing node 410 associated with the linear broadcast a broadcast-ready audio output. In one embodiment, the broadcast-ready audio output is provided by an audio interface 122 of sidecar appliance 456. In one embodiment, integration of the determined content item is independent of the broadcast automation system.

In a step (not shown), the sidecar appliance 456 records an audio affidavit associated with the mixing node and stores the audio affidavit to memory. In one embodiment, the audio affidavit is reported to a dashboard via the communication interface. In one embodiment, the sidecar appliance provides security preventing a local user from accessing at least one of the following: metadata, content, rules, operational code, settings, and behavior. In one embodiment, the sidecar appliance buffers at least one of the metadata and content to handle short-term loss of at least one of network connectivity and power.

Figure 10:
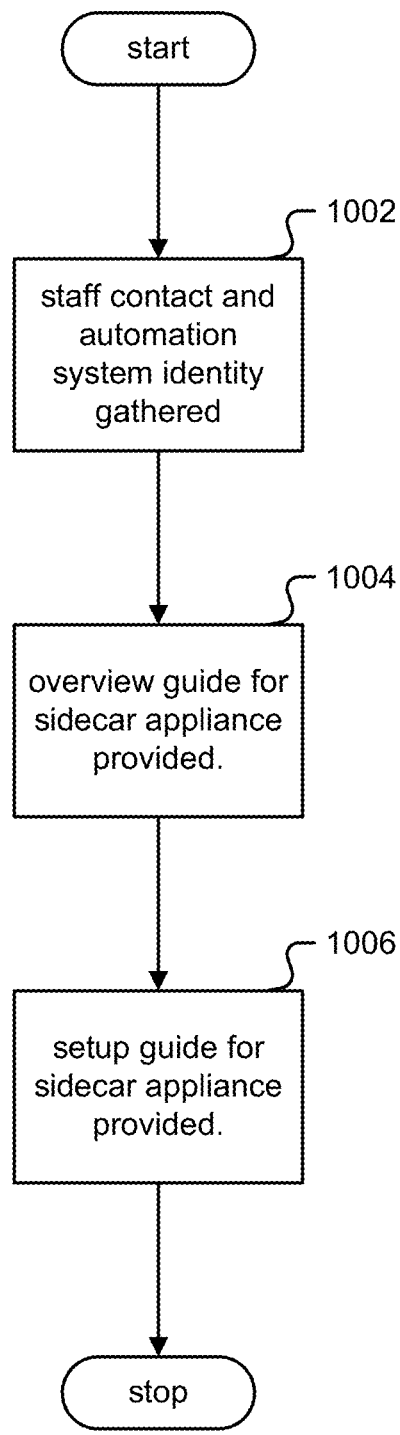
FIG. 10 is a flow chart illustrating an embodiment of a process for setting up a sidecar appliance.

FIG. 10 is a flow chart illustrating an embodiment of a process for setting up a sidecar appliance. In one embodiment, the process in FIG. 10 is carried out via an email pointer to new station 210 staff when they first receive a sidecar appliance, and this process illustrates the ease of which the appliance is integrated within station 210.

In step 1002, an engineering contact, broadcast market, and shipping address is gathered by the staff, as well as an automation system 404 self-identified to ensure full compatibility with the sidecar appliance 456.

In step 1004, an overview guide of the sidecar appliance is provided. Example text may include:

"Sidecar Overview.

The Sidecar Ad Server appliance is installed as a necessary component of the Sidecar Ad Delivery Platform. The platform is licensed by a programmatic ad network ("PAN") to dynamically select and insert audio ads in real time when triggered by local automation. The appliance plays out audio ad content, but does not necessarily pass through program audio.

Sidecar Workflow and Operation:

Your station will receive a break placement schedule from a PAN, either through an electronic or traditional order process. PAN orders are entered into local traffic, scheduling the dedicated Sidecar cart (encoded with network and break length information). For example, <YOUR STATION> final logs will contain many to the PAN cart when imported into local automation. When automation begins playing the Sidecar cart, a play break trigger is sent to the Sidecar appliance. Sidecar plays audio spots for the duration of the break, covering the "silent cut" playing on automation. Sidecar audio output is summed or mixed with program audio (automation system programming) to produce main program audio as fed to console and audio chain/STL. Sidecar records main program audio, verifies the spot play, and reports performance and compliance to a Cloud Platform.

What is Included with this Sidecar?

Each enterprise class Sidecar appliance ships with one or more of the following:

1. Pre-installed OS and base Sidecar software image
2. Pre-installed broadcast audio card
3. Digital and analog audio cables
4. Rack mount rails
5. Power cord
6. Sidecar front bezel What is Helpful for Installation?

Before you begin your installation, the following resources will be helpful:

1. Persistent Internet access available to the network where the Sidecar appliance will be installed and configured on
2. Ability to mix (or sum) the Sidecar audio output with automation system program audio (the program source containing PAN breaks)
3. Ability to connect pre-delay, pre-processed, main program audio to the Sidecar audio inputs (as fed to broadcast audio chain)

Sidecar Appliance models. The determination of the Sidecar appliance models delivered to your station(s) is based on audience size and the number of stations at your facility. Details about each model is provided below.

Sidecar Basic

Features:

1. Stereo analog inputs and outputs (balanced, XLR)
2. Stereo digital AES inputs and outputs (44.1 kHz/48 kHz, XLR)
3. Headphone output
4. Gb Ethernet
5. Dual USB 2.0 (keyboard only required for initial setup)
6. VGA (monitor only required for initial setup)
7. Single, non-redundant, power supply
8. Software RAID HDDs The basic appliance occupies a 1 U rack slot, with the following dimensions:

1. Height 42.8 mm
2. Width of front bezel 482.6 mm
3. Width after rack flange 434 mm
4. Depth after rack flange 390.7 mm
5. Depth including front bezel 425.7 mm
6. Max Weight 17.76 lbs Sidecar Premium Features include everything in Sidecar Basic (above), plus:

1. Dual, redundant, power supplies
2. Hardware RAID HDDs

The premium appliance occupies a 1 U rack slot, with the following dimensions:

1. Height 42.8 mm
2. Width of front bezel 482.6 mm
3. Width after rack flange 434 mm 4. Depth after rack flange 607 mm
5. Depth including front bezel 642 mm
6. Max Weight 42.55 lbs Sidecar Quad features include everything in Sidecar Premium (above), plus:
1. Four sets of stereo analog inputs and outputs (balanced, XLR)
2. Four sets of stereo digital AES inputs and outputs (44.1 kHz/48 kHz, XLR)

The appliance occupies a 1 U rack slot, with the following dimensions:
1. Height 42.8 mm
2. Width of front bezel 482.6 mm
3. Width after rack flange 434 mm
4. Depth after rack flange 607 mm
5. Depth including front bezel 642 mm
6. Max Weight 42.55 lbs Installation Overview.

An example summary of steps required to complete installation, testing, and certification are provided below. Review and note the station assignments to your appliance (s) as listed in the Setup form. Connect your Internet enabled network to Port 1 of Sidecar, and follow the procedure described in Installation: Part 1 to configure Sidecar on your network and enable communication with the Sidecar Platform. Once networked and powered up, use the Sidecar Control console utility to configure audio settings for your station installation. Connect the Sidecar audio outputs to always mix with automation program audio, as described in Installation: Part 2, step 1. Connect main program audio to Sidecar audio inputs, as described in Installation: Part 2, step 2. Create a dedicated break cart, and configure your automation system if necessary, as described in Installation: Part 3.

Use the schedule form in Installation: Part 4, to alert the Station Support team of the day and time you will be running a test break. Manually insert the PAN cart to run within a local break on the day and time reported, and allow Sidecar to play on-air. You will receive an automated test result analysis. If you need to make adjustments, make them, and test again (you don't have to schedule an appointment each time) Station Support will audit and confirm the test break. The appointment should be made in advance, to alert the platform and operations team that a test was intended. If more convenient, tests may be run overnight.

Listen to the test break closely when it runs and note spot placement, audio quality, and if any audio level adjustments are required, they may be made using the Sidecar Control Utility. Use the test results form in Installation: Part 6, to report pass/fail results. Once submitted, Station Support will follow up with audit results. For Sidecar certification, schedule a final appointment using the form in Certification, and direct your traffic team to schedule the PAN cart in traffic. Confirm the break triggered and ran properly on-air. Station Support will audit and confirm the certification break. manually test. After certification, the PAN will provide order and schedule instructions.

When your Sidecar arrives, return to this guide to install, test, and certify your station(s)."

In step 1006, a setup guide of the sidecar appliance is provided. Example text may include:

"Sidecar Configuration.

Carefully review the information below and note how to connect your station(s) to the Sidecar appliance. After you click Start Installation at the bottom of this section, and complete the network installation in the next section, your appliance(s) will download the latest software updates. This process may take up to 60 minutes after the appliance(s) is properly communicating with the PAN Cloud Platform.

Engineering Contact: <INFO FOR REVIEW>

Station to Sidecar Appliance Mapping:

For each Sidecar Basic or Sidecar Premium, note the preassigned, unique appliance serial number (S/N) for each station in the table below. If you intend to use TCP/IP messages to trigger the Sidecar breaks, also note the Network "Listening" Port which will need to be configured into your local automation system.

For each Sidecar Quad, where multiple stations are assigned to the same appliance, the Audio Channel and the Network "Listening" Port must be unique for each station.

Before rack mounting your equipment, carefully check the S/N on the appliance and make sure it matches the intended station as shown below. Pay close attention to the serial numbers, as they may appear similar across appliances. If a serial number is missing for a station, email Station Support.

Click on the button below to start installation."

In step 1008, an installation guide of the sidecar appliance is given. Example text may include:

"Installation Prerequisites.

Before you begin Sidecar installation for each of your stations, confirm the following resources are available.
1. One open network switch port to connect Sidecar to your internal network and access the Internet;
2. Equipment to mix, or sum, Sidecar audio output with program audio, typically using the mixing capabilities of your automation system, a dedicated mixer, active audio switch, or console. NB: It is not recommended to use your studio console to mix Sidecar output with main program audio, but if that is your only option, take the necessary steps to ensure the Sidecar "pot" is always on, set to a standard level, and clearly marked to avoid potting down the Sidecar audio feed. It is highly recommended to mix the Sidecar output prior to the console;
3. Pre-delay, pre-processed, main program audio available to connect to the Sidecar audio input (this audio feed includes the mix of programming and Sidecar ads);
4. Automation systems capable of either sending a TCP/IP start break trigger to the appliance and playing a silent cut cart (Sidecar/PAN cart), or playing a special trigger tone cut containing sub-audible audio trigger tones; and
5. Traffic system capable of scheduling and outputting logs to automation containing the dedicated Sidecar/PAN cart.

Rack Sidecar

We recommend properly rack mounting your appliance in a location that supports simple and clean access to the resources listed in the Installation Prerequisites section.
1. Confirm the Sidecar serial number matches the expected installation station;
2. Rack mount the Sidecar appliance;
3. Connect primary power to the appliance, and secondary power (secondary circuit) if available (Sidecar Premium and Quad only);
4. Connect a monitor and keyboard using the rear panel connectors. NB: If space or equipment are limited, the monitor and keyboard are primarily used for initial setup and configuration, and may be removed after certification; and
5. Attach the front bezel.

Sidecar I/O Connectors.

The Sidecar appliances are based on enterprise class systems, and configured into three models, Sidecar Basic, Sidecar Premium, and Sidecar Quad. For reference purposes, rear panel IO connectors and cable pinouts for each appliance type may be provided. Please ensure that you install the correct appliance and model for each of your stations, which may be confirmed with serial numbers.

Part 1: Network Configuration.

Rack mounted and prepared for initial power up, the first step is to configure the Sidecar appliance to communicate with the PAN Cloud Platform. For your Sidecar appliance to communicate with the PAN Cloud Platform, the appliance must be connected to a local network with Internet access. It is recommended that you configure a static IP address to the appliance, however, if this is not an option, DHCP networking is available. Do not use DHCP networking if you plan to use TCP/IP triggers for network break plays.

Static IP Address Configuration.

Static, fixed, IP configuration is required if using TCP based messages to trigger the Sidecar appliance. Follow these steps to manually assign a fixed IP address:
1. Connect your network to Port 1 of Sidecar;
2. Confirm your firewall settings do not block outgoing traffic;
3. Connect a keyboard and monitor to the appliance for setup;
4. Power up, or reset your appliance, by holding the front button of the appliance;
5. Shortly after power on, the appliance will display a login prompt: enter 'network' and press Enter/Return key. If you are asked for a password, you have most likely included a space before or after 'network'; hit return a couple of times and try again. You should see a network configuration window;
6. Press right arrow key. The ethernet configuration window should now be displayed;
7. Enter the appropriate information into the first 3 IP fields and 2 DNS fields, and store values by pressing the F10 key. You should now be returned to the main window;
8. Press Enter/Return key to apply the configuration. The new IP setup should be displayed at the bottom left of the screen;
9. Quit network configuration by pressing Q. You should return to the login prompt—you do not need to type anything further at this point.

Your network setup is complete, please proceed to Sidecar Control Utility section to configure your appliance, and then on to Part 2: Audio Installation.

DHCP Configuration.

Do not use DHCP if using TCP based network triggers, this may only be used if you plan to use audio trigger tones. To use DHCP for network configuration:
1. Confirm that you are running a DHCP server on the network that will be connected to Sidecar;
2. Confirm your firewall settings do not block outgoing traffic;
3. Connect a keyboard and monitor to Sidecar for setup;
4. Connect your network to Port 1 of the Sidecar;
5. Power up, or reset your appliance, by holding the front button of the appliance; and
6. When booted, you should see a login prompt—you do not need to type anything further at this point.

Your network setup is complete, please proceed to Sidecar Control Utility section to configure your appliance, and then on to Part 2: Audio Installation.

If your firewall restricts certain types of network traffic, please contact your network administrator or corporate IT department to add the network policies described under Network Traffic Requirements:

For Sidecar to communicate with the PAN Cloud Platform, the following outbound network traffic should be allowed. This network traffic allows schedule updates, downloading audio spots, software and configuration updates, clock updates, platform communication, monitoring, and real-time performance data. [Port Listing] Calls below are http, https, SSH, NTP, DNS <list of IP addresses to allow>

The Sidecar service is designed to tolerate Internet service outages without impacting local playback operation, however, you may be contacted by operations if your appliance stops communicating with the Sidecar Platform for any extended period of time.

Sidecar Control Utility.

An appliance console Sidecar Control Utility should have downloaded to your Sidecar appliance to aid with setup, troubleshooting, and to verify proper operation. The utility should be used for initial setup, but may also be used anytime for adjustments or changes. The Sidecar Control Utility manual is available to download or print.

The following is required to run the console utility.
1. Part 1: Network Configuration must be complete, allowing the Sidecar appliance to communicate with the Sidecar Cloud Platform;
2. A keyboard and display must be connected to the appliance; and
3. The appliance should have downloaded the latest version of software which includes the Sidecar console Control Utility. If you see "Sidecar Installed" you should be able to launch the utility by typing 'control' (no spaces before or after, you can hit return a few times). If a password is asked, and you have no spaces or incorrect characters, the utility has not been downloaded, you may have to email Station Support.

The following support features are available in the utility.
1. Confirm Sidecar Ad Server ("Appliance") is properly networked, and communicating with Sidecar Cloud Platform;
2. Change Appliance global sample rate;
3. Configure stations by selecting different Audio Ports (Call Letters are displayed);
4. Change audio input type;
5. Verify input audio (left and right), and adjust the correct input audio gain to optimize for confirmation recordings;
6. Adjust output level gain;
7. Generate audio tone to test output;
8. Display up to the past 5 triggers;
9. Network Listen Port assignment (informational only); and
10. Confirm a connection is established to the Network Listen Port.

Use the Control Utility to verify your appliance is connected to the Sidecar Cloud Platform:
11. At the console prompt (Sidecar installed>), type control and press return;
12. If there is no proper networking or connection to the backend, you will see the utility try to run (Sidecar logo) with a spinner and then it will timeout;
13. If successfully connected you will see the menus on the left (Home, Audio Port 1, etc); and
14. At the bottom of the screen you should see a date/time stamp showing the last connection with the platform.

Part 2: Audio Installation.

It is now time to connect input and output audio to the Sidecar appliance. There are a number of acceptable installation methods, the determination of which is left to the local station engineer based on automation system, station wiring, installation topology, and resource (equipment) availability. From a high level, Sidecar audio output must be mixed with program audio, and Sidecar audio input should be fed with pre-delay, pre-processed main program audio. The main program audio fed into Sidecar must include PAN spots for automated verification purposes.

Sidecar Basic or Premium Audio Description.

For Sidecar Basic or Sidecar Premium, you may choose to use either analog or digital audio for your installation. It is assumed that the input and output audio types match, however, since both analog and digital outputs are active, you may elect to use either output type. Diagrams are provided to illustrate the required audio connections for either analog or digital installations.

When using AES digital audio, the input sample rate frequency (clock) must match what you will enter shortly as you configure the Sidecar audio settings using the Sidecar Control Utility. The output sample rate clock will match the input sample rate clock.

Sidecar Quad supports the use of either analog or digital audio on a station by station basis. It is assumed that the input and output audio types match for each station, however, since both analog and digital outputs are active, you may elect to use either. Diagrams will be provided to illustrate a station (Station A) connected to the first set of analog inputs/outputs (Audio Port Number 1), including a Station A digital audio in (main program audio) & Station A analog audio out (spots) with Sample Rate Conversion set to 44.1 kHz. Leave the LTC and any GPIO connectors unconnected.

Configure Sidecar Audio Settings.

Prior to progressing to audio installation, you will need to launch the Control Utility to configure your audio type and sample rate.
1. At the console prompt (Sidecar installed>), type control and press return. Make sure there are no spaces or other characters before or after control, otherwise you will be prompted for a password;
2. Navigate to Home;
3. Use the right arrow key to navigate to Audio Sample Rate;
4. Select the appliance sample rate (that all stations connected to the device will use); and
5. To save the setting, type "s".

Step 1—Connect Audio Output.

Connect Sidecar audio output to mixing, or summing, equipment to combine program audio with Sidecar ads. When triggered to play ads, Sidecar will cover the silent cut break cart playing on local automation.

We recommend that you mix the Sidecar audio output using a mixer, active audio switch, or automation system (internal mixing), prior to the studio console, however, mixing at the console is also acceptable. If you choose to mix at the console, make sure the console "pot" is always on, set to a standard level, and clearly marked to not pot down or turn off. If your station uses Audio-over-IP (AoIP) you will require an AoIP I/O node (bridge) to interface with Sidecar.

Audio Output Specifications

Audio Output Level

Sidecar, by default, outputs spots at an average level of 0 dBm. All audio spots that play out from the appliance are produced for both level and length.

Audio Type

We recommend using the same audio type as the selected input type, however, all outputs are active. For example, if the input type selected is digital, we recommend using the digital outputs. If analog is used for the input, we recommend using analog audio outputs.

AES Output Sample Rate Clock

Sidecar Basic and Premium use the input clock rate supplied to the appliance to set the output clock rate. For example, if the AES input sample clock rate is 44.1 kHz, the output sample clock rate will be 44.1 kHz. Sidecar Quad uses an internal clock source, and by default the AES output sample rate is set to 44.1 kHz. All station output sample rates must match, regardless of each individual station input clock rate. If you would like to change the internal clock rate, this can be done using the Control Utility.

You may adjust your audio output level using the Control Utility:
1. At the console prompt (Sidecar installed>), type control and press return;
2. Navigate to Audio Port for the station you would like to test; call letters are displayed to the right of each Audio Port menu item;
3. Use the arrow keys to navigate to Audio Output Gain, and change the level; and
4. Press "s" to save.

To test the audio output, you may use the Control Utility to generate a 1 kHz test tone:
1. At the console prompt (Sidecar installed>), type control and press return;
2. Navigate to Audio Port for the station you would like to test; call letters are displayed to the right of each Audio Port menu item;
3. Use the arrow keys to navigate to Test tone length, and enter the length of the tone you would like to generate;
4. Press "s";
5. Arrow down to 1 kHz test tone, and then right arrow; and
6. To start the tone, select On by pressing "x".

Step 2—Connect Audio Input.

Connect pre-delay, pre-processed, main program audio to both the left and right inputs of the Sidecar appliance. If your station is mono, feed the mono channel to both left and right inputs.

Main program audio is typically fed from the output of a studio console, or distribution amp/audio router, and contains main program audio plus Sidecar ads.

Audio Input Requirements

Audio Level

Sidecar expects an average peak audio level of +4 dB, not consistently dropping below −12 dB or exceeding +6 dB.

Two Channel Input Audio

Connect stereo audio to the input. If your station is mono, feed the same mono source to both left and right inputs.

In Phase Audio

The left and right audio channels may be in phase, and should not have reverse polarity between the left and right channels fed into the appliance. Also, please make sure the polarity of the left and right outputs are also matching.

Clean Audio

Ensure that the audio fed into Sidecar is clean, and does not contain excessive noise on either channel. Any 60 Hz hum, high frequency noise, over processing, open mic noise, digital noise, etc. may require attention.

Balanced L & R Channels

The audio fed into the left and right input channels should be balanced, and similar in level.

Use the Control Utility to verify audio input levels and optimize input offset for quality:

1. At the console prompt (Sidecar installed>), type control and press return;
2. Navigate to Audio Port for the station you would like to test; call letters are displayed to the right of each Audio Port menu item;
3. A dynamic L-R input level meter is shown at the bottom, where the peak programming level should just reach the max meter reading; and
4. If the levels are too low or high, navigate to Audio Input Gain, adjust gain, and press "s" to save.

Step 3—Loopback Unused Audio.

Although not used for normal operation, we recommend you loopback the unused audio by connecting the audio inputs to audio outputs not used for station installation, directly behind the appliance. For example, if you are using analog audio for you installation, connect the digital audio inputs to the digital audio outputs. Similarly, if you are using digital audio for your installation, connect the analog audio inputs to the analog audio outputs.

Part 3: Create Sidecar Break Cart & Configure Automation.

If your automation system has the ability to support TCP and/or IP based trigger messages, then you will need to configure your automation system to communicate with the Sidecar appliance over your network. If your automation system cannot support IP based trigger messages, then we recommend using the proprietary PAN (sub-audible) audio trigger.

Regardless of the chosen trigger method, a "silent" cut, the full length of the Sidecar break, should play as the cart audio media. The "dead-roll" cart either contains, or is associated with, an IO command to trigger the PAN break. The IO command is uniquely mapped to the PAN break and break length.

If your automation system supports multiple trigger methods, they will be described below. For each of your stations, carefully follow the steps below for your automation system and preferred trigger method.

Here is the information we have about your installation, for reference purposes. <Table with Station(s) and for each Station the Network Package(s)>

Audio Vault FleX (XTone-TCP/IP) Trigger Method.

For stations running AVFleX, we recommend sending a TCP/IP message to RadioSpot to trigger a break. This is done by assigning a TCP/IP message to an XTone string or Marker Text. Once configured, Sidecar listens to the network (port) for an incoming connection. AV connects to the appliance over the assigned IP:port, and sends trigger messages to indicate a break start. Once triggered, Sidecar will play spots to cover the break length.

Step 1—Communicate Network Settings.

Email Station Support the following information:
1. Station call letters
2. Sidecar IP Address
3. Socket/Port AV will connect to (default 8900). If you have a Sidecar Quad, use ports 8900, 8901, 8902, and 8903 for stations A, B, C, and D, respectively Step 2—Identify the XTone String or Marker Text Locate the correct network (TCPIP) trigger message from the Network Trigger Messages table, in the Support section, and assign this string as the XTone string, or marker text.

Step 3—AudioVault Configuration

AudioVAULT systems: Vault2 or AVFleX, will be using either AVAir or AVAir/AVSat configuration. This will depend on the available channels on the console and the mixing requirements of Sidecar audio with AudioVAULT audio channels.

In the case of using AVAir and AVSat there are a couple of possibilities:
1. There is an independent Audio Channel on the Audio Console; and/or
2. AVSat shares an audio channel with AVAir on the console.

In either case, the audio from Sidecar must be available on the AVSat's input, either as a direct feed or thru an Input Channel on an audio switcher that AudioVAULT can switch at the time the Sidecar cut play from AVAir as scheduled thru Traffic on AVScheduler.

Step 4—AudioVault Remote Control with TCP/IP Configuration

It is also necessary to define the TCP remote control device by adding the following section to the audiovau.ini on the AVAir PC:

[RemoteControl.JRSS]
DeviceType=SOCKET
SocketType=Called
ServiceName=8900

The ServiceName is the TCP Port that AVAir will use to send the TCP String to Sidecar.

For AVFleX

Under the [AVAir] section add:
IDD_XTone 1=JRSS:[Sidecar 30 sec String]\0xD;
IDD_XTone2=JRSS:[Sidecar 60 sec String]\0xD;

For AVAir on 9.20

Under the [AVAir] section add:

$IDD\_Marker\_1 = JRSS : \backslash 0xD;$ $IDD\_Marker\_2 = JRSS : \backslash 0xD;$

...

$IDD\_Marker\_n = JRSS : \backslash 0xD;$

The Marker Text must match the string expected by Sidecar and the PAN. Once the audiovau.ini has been configured, AVAir or AVAirEngine must be restarted for the changes to take effect. For reference purposes, you may also review AVFleX instructions.

Audio Trigger Method—for any Automation System

The simplest installation method is to use the proprietary audio trigger method, requiring no additional automation system configuration. Since the trigger is "in-band" with program audio, the automation system continues to operate uninterrupted, while Sidecar covers the break.

Create Cart

To create the Sidecar break cart to run PAN spots, follow this procedure:
1. Identify the PAN package contracted with your station (s), and download the corresponding network package audio trigger file which matches the contracted break length (i.e., 30 sec, 60 sec, etc.). The audio trigger file is encoded with the network, package and break length, so it is important to download the correct audio trigger file provisioned for your station. Before downloading a file to test, confirm the following for each of your stations:

i. Contracted break length
ii. Network Package for each station
iii. Supported file format type (MP3 or WAV), that may be directly imported into automation (avoid any "dubbing" level changes or tone processing)
iv. If your automation system is configured to use playback rate expansion or compression (e.g. block fill/max stretch, etc.), it is important that you download the audio trigger file supporting a wider playback tolerance range (+/−4%).
2. Download the trigger audio file, or files, that match your contract and station playback settings:

| Network | Length (sec) | Sample Rate (kHz) | Playback Rate Tolerance | Download | Description |
|---|---|---|---|---|---|
| PAN1 | 30 | 44.1 | +/−2.5% | .mp3, .wav links | Audio Trigger 2.0 encoded 30 sec break audio trigger tone file with +/−2.5% automation playback variation |
| PAN1 | 60 | 44.1 | +/−2.5% | .mp3, .wav links | Audio Trigger 2.0 encoded 60 sec break audio trigger tone file with +/−2.5% automation playback variation |

3. Import the downloaded file into station automation system;
4. Confirm the imported file matches the expected break length. If during import the file has been trimmed under the desired length, download the trigger file that is 5 sec longer than the contracted length, re-import, and trim (or mark) the end, of the file down to the correct length; and
5. In traffic, create a dedicated cart number (any number works) associated with the imported audio trigger file. Enter any additional information into the traffic fields to easily identify the PAN break, including network package, break length, and description or category required for accounting and tracking purposes.

For this particular trigger method, Sidecar does not operate on any data included in the traffic fields, only the data encoded in the audio file.

Part 4: Schedule Test Break Appointment

You are now ready to test the Sidecar break. Please submit form to schedule your test. Communicate the day and approximate time when you will be scheduling your test cart to run within an existing break. We recommend manually inserting the Sidecar break towards the end of an existing local break.

Part 5: Run Test Break

Manually insert the Sidecar break within an existing ad break. Allow the break to play on-air, but be prepared to advance the break, in the case of an incorrect (or missing) trigger command, or the audio output path not properly wired (or enabled). Listen closely to the break and ensure that levels, polarity, and timing all meet proper station standards.

If using audio triggers, any audio content (programming, 60 Hz "hum", noise floor, etc.) must fall below the audio trigger tones by at least 6 dB for approximately 100 ms to ensure the audio trigger tones are not covered and are properly recognized. The trigger tone repeats for seconds in the case that content covers the beginning of the cart. Once a clean trigger tone sequence is received, Sidecar will trigger.

Use the Control Utility to verify triggers are properly received:
1. At the console prompt (Sidecar installed>), type control and press return;
2. Navigate to Audio Port for the station you would like to test; call letters are displayed to the right of each Audio Port menu item;
3. Recent Triggers displays up to the last 5 triggers received; and
4. Network trigger client displays the automation system IP address that has established a connection with that station (Network Listen Port)

Part 6: Report Test Break Results

Listen to the triggered break, and note audio levels, timing, and audio quality. Report test results (success/fail) using a form provided. If the test failed, use the email thread generated by your test to include comments. If you need to adjust audio levels, use the Sidecar Control Utility to make any changes. If the test was successful and not changes are requested, simply report success and Station Operations will update your station status (via email)."

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A content insertion appliance for linear radio broadcast, comprising:
   a communication interface configured to receive via a network one or both of a metadata associated with content to be integrated into a linear radio broadcast and a content data comprising content to be integrated into the linear radio broadcast;
   an audio output interface configured to provide broadcast-ready audio to a local input of a linear radio broadcast mixer for a linear radio broadcast station;
   an audio input interface configured to receive broadcast-ready audio from a local output of the linear radio broadcast mixer;
   a memory configured to, in the event of network connectivity loss:
      provide a local audio cache for audio playback; and
      support copy instructions and schedule; and
   a processor coupled to the communication interface and the memory and configured to:
      receive from a broadcast automation system associated with the linear radio broadcast a trigger to integrate content into said linear radio broadcast;
      determine based at least in part on said metadata a determined content item to be integrated into the linear radio broadcast in response to the trigger; and
      integrate the determined content item into the linear radio broadcast using a cataloging audio fingerprint, including by providing to a mixing node associated with the linear radio broadcast a broadcast-ready audio output, wherein the cataloging audio fingerprint uses a modulation scheme in less audible frequencies.

2. The system recited in claim 1, wherein the network is the Internet.

3. The system recited in claim 2, wherein the one or both of the metadata and the content data are received from a cloud-based node.

4. The system recited in claim 3, wherein the cloud-based node is configured to optimize reception across a plurality of appliances, each at a different linear radio broadcast node.

5. The system recited in claim 1, wherein the trigger is at least one of the following: an audio trigger, a physical relay closure, a serial/parallel port signaling, a TCP/IP trigger, and an XML trigger.

6. The system recited in claim 1, wherein determining based at least in part on said metadata the content item comprises using said metadata to indicate a set of instructions to be interpreted and applied dynamically.

7. The system recited in claim 6, wherein determining based at least in part on said metadata the content item does not comprise using said metadata to indicate an ad playlist.

8. The system recited in claim 6, wherein determining based at least in part on said metadata the content item comprises using external data.

9. The system recited in claim 8, wherein external data comprises at least one of the following: time of day, date, and other context data.

10. The system recited in claim 6, wherein the set of instructions indicates a set of rules.

11. The system recited in claim 10, wherein the processor is further configured to use a rule engine to apply the set of rules to determine ad copy dynamically.

12. The system recited in claim 11, wherein a rule is associated with at least one of the following: locally enforced show targeting, locally enforced show exclusion, and a programming schedule change.

13. The system recited in claim 1, wherein integrating the determined content item is independent of the broadcast automation system.

14. The system recited in claim 1, further comprising a memory configured to store the content item, wherein the memory is coupled to the processor.

15. The system recited in claim 14, wherein the processor is further configured to record an audio affidavit associated with the mixing node and store the audio affidavit to the memory.

16. The system recited in claim 15, wherein the processor is further configured to report the audio affidavit to a dashboard via the communication interface.

17. The system recited in claim 1, wherein the processor is further configured to provide security preventing a local user from accessing at least one of the following: metadata, content, rules, operational code, settings, and behavior.

18. The system recited in claim 1, wherein the processor is further configured to buffer at least one of the metadata and content to handle short-term loss of at least one of network connectivity and power.

19. A method, comprising:
receiving via a network one or both of a metadata associated with content to be integrated into a linear radio broadcast and a content data comprising content to be integrated into the linear radio broadcast, wherein an audio output interface is configured to provide broadcast-ready audio to a local input of a linear radio broadcast mixer for a linear radio broadcast station and an audio input interface is configured to receive broadcast-ready audio from a local output of the linear radio broadcast mixer;
in the event of network connectivity loss, providing a local audio cache for audio playback and supporting copy instruction and schedule;
receiving from a broadcast automation system associated with the linear radio broadcast a trigger to integrate content into said linear radio broadcast;
determining based at least in part on said metadata a content item to be integrated into the linear radio broadcast in response to the trigger; and
integrating the determined content item into the linear radio broadcast using a cataloging audio fingerprint, including by providing to a mixing node associated with the linear radio broadcast a broadcast-ready audio output, wherein the cataloging audio fingerprint uses a modulation scheme in less audible frequencies.

20. A computer program product, the computer program product being embodied in a non-transitory computer readable storage medium and comprising computer instructions for:
receiving via a network one or both of a metadata associated with content to be integrated into a linear radio broadcast and a content data comprising content to be integrated into the linear radio broadcast, wherein an audio output interface is configured to provide broadcast-ready audio to a local input of a linear radio broadcast mixer for a linear radio broadcast station and an audio input interface is configured to receive broadcast-ready audio from a local output of the linear radio broadcast mixer;
in the event of network connectivity loss, providing a local audio cache for audio playback and supporting copy instruction and schedule;
receiving from a broadcast automation system associated with the linear radio broadcast a trigger to integrate content into said linear radio broadcast;
determining based at least in part on said metadata a content item to be integrated into the linear radio broadcast in response to the trigger; and
integrating the determined content item into the linear radio broadcast using a cataloging audio fingerprint, including by providing to a mixing node associated with the linear radio broadcast a broadcast-ready audio output, wherein the cataloging audio fingerprint uses a modulation scheme in less audible frequencies.

* * * * *